United States Patent [19]
Hoffman et al.

[11] Patent Number: 6,117,584
[45] Date of Patent: Sep. 12, 2000

[54] THERMAL CONDUCTOR FOR HIGH-ENERGY ELECTROCHEMICAL CELLS

[75] Inventors: Joseph A. Hoffman, Minneapolis; Michael K. Domroese, South St. Paul, both of Minn.; David D. Lindeman, Hudson, Wis.; Vern E. Radewald, Austin, Tex.; Roger Rouillard, Beloeil, Canada; Jennifer L. Trice, Eagan, Minn.

[73] Assignee: 3M Innovative Properties Company, St. Paul, Minn.

[21] Appl. No.: 08/900,428

[22] Filed: Jul. 25, 1997

[51] Int. Cl.[7] ........................................... H01M 6/50
[52] U.S. Cl. .................. 429/120; 429/101; 429/152; 429/153; 429/162; 429/26; 429/66; 429/120; 429/121
[58] Field of Search ..................... 429/101, 152, 429/153, 162, 26, 66, 120, 121

[56] References Cited

U.S. PATENT DOCUMENTS

| | | |
|---|---|---|
| 2,812,376 | 11/1957 | Yardney . |
| 3,193,412 | 7/1965 | Salkind et al. . |

(List continued on next page.)

FOREIGN PATENT DOCUMENTS

| | | |
|---|---|---|
| 044 753 A1 | 1/1982 | European Pat. Off. . |
| 145 498 A2 | 6/1985 | European Pat. Off. . |
| 0 170 883 A1 | 2/1986 | European Pat. Off. . |
| 177 225 A1 | 4/1986 | European Pat. Off. . |
| 0 225 767 A2 | 6/1987 | European Pat. Off. . |
| 244 683 A1 | 11/1987 | European Pat. Off. . |
| 310 075 A2 | 4/1989 | European Pat. Off. . |
| 336 102 A2 | 10/1989 | European Pat. Off. . |
| 569 035 A1 | 11/1993 | European Pat. Off. . |
| 570 590 A1 | 11/1993 | European Pat. Off. . |
| 584 639 A1 | 3/1994 | European Pat. Off. . |
| 643 429 A2 | 3/1995 | European Pat. Off. . |
| 652 620 A1 | 5/1995 | European Pat. Off. . |
| 700 109 A1 | 3/1996 | European Pat. Off. . |
| 0 721 247 A2 | 7/1996 | European Pat. Off. . |
| 774 795 A2 | 5/1997 | European Pat. Off. . |
| 780 920 A1 | 6/1997 | European Pat. Off. . |
| 2 511 547 | 2/1983 | France . |
| 2 721 407 | 12/1995 | France . |
| 3246968 A1 | 7/1984 | Germany . |
| 4218381 C1 | 5/1993 | Germany . |
| 42 25 746 A1 | 2/1994 | Germany . |

(List continued on next page.)

*Primary Examiner*—Maria Nuzzolillo
*Assistant Examiner*—Mark Ruthkosky
*Attorney, Agent, or Firm*—Mueting, Raasch & Gebhardt, P.A.

[57] ABSTRACT

A thermal conductor for use with an electrochemical energy storage device is disclosed. The thermal conductor is attached to one or both of the anode and cathode contacts of an electrochemical cell. A resilient portion of the conductor varies in height or position to maintain contact between the conductor and an adjacent wall structure of a containment vessel in response to relative movement between the conductor and the wall structure. The thermal conductor conducts current into and out of the electrochemical cell and conducts thermal energy between the electrochemical cell and thermally conductive and electrically resistive material disposed between the conductor and the wall structure. The thermal conductor may be fabricated to include a resilient portion having one of a substantially C-shaped, double C-shaped, Z-shaped, V-shaped, O-shaped, S-shaped, or finger-shaped cross-section. An elastomeric spring element may be configured so as to be captured by the resilient conductor for purposes of enhancing the functionality of the thermal conductor. The spring element may include a protrusion that provides electrical insulation between the spring conductor and a spring conductor of an adjacently disposed electrochemical cell in the presence of relative movement between the cells and the wall structure. The thermal conductor may also be fabricated from a sheet of electrically conductive material and affixed to the contacts of a number of electrochemical cells.

32 Claims, 18 Drawing Sheets

FOREIGN PATENT DOCUMENTS

| | | |
|---|---|---|
| 19618897 A1 | 11/1997 | Germany . |
| 59-091658 | 5/1984 | Japan . |
| 59-117061 | 7/1984 | Japan . |
| 59-139555 | 8/1984 | Japan . |
| 61-099278 | 5/1986 | Japan . |
| 63-062156 | 3/1988 | Japan . |
| 01320758 | 12/1989 | Japan . |
| 04294071 | 10/1992 | Japan . |
| 05166533 | 7/1993 | Japan . |
| 6-036756 | 2/1994 | Japan . |
| 6-203823 | 7/1994 | Japan . |
| 07250788 | 10/1995 | Japan . |
| 07282841 | 10/1995 | Japan . |
| 08115711 | 5/1996 | Japan . |
| 09-017416 | 1/1997 | Japan . |
| 1066-385 | 6/1986 | Russian Federation . |
| 1582979 | 1/1981 | United Kingdom . |
| 2 206 726 | 1/1989 | United Kingdom . |
| 2 282 924 | 4/1995 | United Kingdom . |
| 2295718 | 6/1996 | United Kingdom . |
| WO 91/17451 | 11/1991 | WIPO . |
| WO 92/02963 | 2/1992 | WIPO . |
| WO 93/01624 | 1/1993 | WIPO . |
| WO 94/14206 | 6/1994 | WIPO . |
| WO 95/00978 | 1/1995 | WIPO . |
| WO 95/26055 | 9/1995 | WIPO . |
| WO 95/34824 | 12/1995 | WIPO . |
| WO 96/17397 | 6/1996 | WIPO . |
| WO 96/19816 | 6/1996 | WIPO . |
| WO 96/22523 | 7/1996 | WIPO . |

U.S. PATENT DOCUMENTS

| | | | |
|---|---|---|---|
| 3,390,014 | 6/1968 | Eisler . | |
| 3,578,506 | 5/1971 | Chassoux . | |
| 3,630,783 | 12/1971 | Przybyla | 136/107 |
| 3,786,466 | 1/1974 | Naito et al. . | |
| 3,793,501 | 2/1974 | Stonestrom . | |
| 3,899,355 | 8/1975 | Chiklis . | |
| 3,937,635 | 2/1976 | Mead et al. | 136/83 R |
| 4,028,479 | 6/1977 | Fanciullo et al. | 429/152 |
| 4,060,669 | 11/1977 | Fanciullo | 429/152 |
| 4,060,670 | 11/1977 | Tamminen | 429/154 |
| 4,080,728 | 3/1978 | Buckler | 29/623.4 |
| 4,091,186 | 5/1978 | Ott et al. . | |
| 4,098,965 | 7/1978 | Kinsman | 429/153 |
| 4,105,807 | 8/1978 | Arora | 427/126 |
| 4,137,627 | 2/1979 | Kinsman | 29/623.4 |
| 4,150,266 | 4/1979 | Patrichi . | |
| 4,152,825 | 5/1979 | Bruneau | 29/623.2 |
| 4,207,389 | 6/1980 | Gunther et al. | 429/164 |
| 4,209,479 | 6/1980 | Gunther et al. | 264/104 |
| 4,233,371 | 11/1980 | Dorrestijn | 429/152 |
| 4,238,721 | 12/1980 | DeLuca et al. . | |
| 4,241,152 | 12/1980 | Klink . | |
| 4,303,877 | 12/1981 | Meinhold . | |
| 4,321,435 | 3/1982 | Grieger et al. . | |
| 4,322,484 | 3/1982 | Sugalski . | |
| 4,342,978 | 8/1982 | Meister . | |
| 4,370,531 | 1/1983 | Tobin . | |
| 4,383,013 | 5/1983 | Bindin et al. . | |
| 4,409,086 | 10/1983 | Haas et al. . | |
| 4,409,538 | 10/1983 | Tabata . | |
| 4,429,026 | 1/1984 | Bruder | 429/152 |
| 4,436,792 | 3/1984 | Tomino et al. . | |
| 4,477,545 | 10/1984 | Akridge et al. | 429/191 |
| 4,479,083 | 10/1984 | Sullivan . | |
| 4,490,707 | 12/1984 | O'Leary . | |
| 4,495,259 | 1/1985 | Uba | 429/161 |
| 4,507,857 | 4/1985 | Epstein et al. | 29/623.2 |
| 4,517,265 | 5/1985 | Belanger et al. . | |
| 4,518,665 | 5/1985 | Fujita et al. . | |
| 4,525,439 | 6/1985 | Simonton | 429/162 |
| 4,547,438 | 10/1985 | McArthur et al. | 429/82 |
| 4,571,468 | 2/1986 | Weldon . | |
| 4,654,278 | 3/1987 | McManis, III et al. . | |
| 4,664,993 | 5/1987 | Sturgis et al. | 429/178 |
| 4,670,703 | 6/1987 | Williams . | |
| 4,691,085 | 9/1987 | Swanson . | |
| 4,692,577 | 9/1987 | Swanson . | |
| 4,707,795 | 11/1987 | Alber et al. . | |
| 4,752,540 | 6/1988 | Chua et al. | 429/56 |
| 4,758,483 | 7/1988 | Armand et al. . | |
| 4,816,354 | 3/1989 | Tamminen | 429/162 |
| 4,824,746 | 4/1989 | Belanger et al. . | |
| 4,828,939 | 5/1989 | Turley et al. . | |
| 4,830,936 | 5/1989 | Planchat et al. . | |
| 4,851,307 | 7/1989 | Armand et al. . | |
| 4,852,684 | 8/1989 | Packard . | |
| 4,883,726 | 11/1989 | Peled et al. | 424/120 |
| 4,887,348 | 12/1989 | Tamminen | 29/623.2 |
| 4,897,917 | 2/1990 | Gauthier et al. . | |
| 4,911,993 | 3/1990 | Turley et al. | 429/27 |
| 4,913,259 | 4/1990 | Packard . | |
| 4,923,582 | 5/1990 | Abrahamson et al. . | |
| 4,927,717 | 5/1990 | Turley et al. | 429/27 |
| 4,961,043 | 10/1990 | Koenck . | |
| 4,967,136 | 10/1990 | Nofzinger . | |
| 4,971,531 | 11/1990 | Aikioniemi . | |
| 4,973,936 | 11/1990 | Dimpault-Darcy et al. . | |
| 4,997,732 | 3/1991 | Austin et al. | 429/153 |
| 5,008,161 | 4/1991 | Johnston | 429/7 |
| 5,057,385 | 10/1991 | Hope et al. . | |
| 5,066,555 | 11/1991 | Tamminen | 429/121 |
| 5,070,787 | 12/1991 | Weldon et al. . | |
| 5,071,652 | 12/1991 | Jones | 429/101 |
| 5,089,027 | 2/1992 | Rossoll et al. | 29/623.2 |
| 5,162,171 | 11/1992 | Jones | 429/101 |
| 5,180,641 | 1/1993 | Burns et al. . | |
| 5,197,889 | 3/1993 | Rizzo et al. . | |
| 5,199,239 | 4/1993 | Younger . | |
| 5,204,194 | 4/1993 | Miller et al. . | |
| 5,227,259 | 7/1993 | Weaver et al. . | |
| 5,227,264 | 7/1993 | Duval et al. . | |
| 5,283,512 | 2/1994 | Stadnick et al. . | |
| 5,300,373 | 4/1994 | Shackle | 429/152 |
| 5,313,152 | 5/1994 | Wozniak et al. . | |
| 5,324,597 | 6/1994 | Leadbetter et al. . | |
| 5,337,042 | 8/1994 | Hormel et al. . | |
| 5,346,786 | 9/1994 | Hodgetts . | |
| 5,354,630 | 10/1994 | Earl et al. | 429/101 |
| 5,363,405 | 11/1994 | Hormel . | |
| 5,382,480 | 1/1995 | Molyneux . | |
| 5,384,212 | 1/1995 | Heiman et al. . | |
| 5,385,793 | 1/1995 | Tiedemann et al. . | |
| 5,393,617 | 2/1995 | Klein . | |
| 5,401,595 | 3/1995 | Kagawa et al. | 429/152 |
| 5,409,787 | 4/1995 | Blanyer et al. . | |
| 5,415,954 | 5/1995 | Gauthier et al. | 429/94 |
| 5,422,200 | 6/1995 | Hope et al. . | |
| 5,423,110 | 6/1995 | Gauthier et al. . | |
| 5,438,249 | 8/1995 | Chang et al. . | |
| 5,478,667 | 12/1995 | Shackle et al. . | |
| 5,478,668 | 12/1995 | Gozdz et al. | 429/127 |
| 5,479,083 | 12/1995 | Brainard . | |
| 5,487,958 | 1/1996 | Tura . | |
| 5,503,947 | 4/1996 | Kelly et al. . | |
| 5,503,948 | 4/1996 | MacKay et al. . | |
| 5,504,415 | 4/1996 | Podrazhansky et al. . | |
| 5,519,563 | 5/1996 | Higashijimaa et al. . | |
| 5,528,122 | 6/1996 | Sullivan et al. . | |
| 5,530,336 | 6/1996 | Eguchi et al. . | |
| 5,532,087 | 7/1996 | Nerz et al. . | |

| | | | | | |
|---|---|---|---|---|---|
| 5,547,775 | 8/1996 | Eguchi et al. . | 5,602,481 | 2/1997 | Fukuyama . |
| 5,547,780 | 8/1996 | Kagawa et al. . | 5,610,495 | 3/1997 | Yee et al. . |
| 5,548,200 | 8/1996 | Nor et al. . | 5,612,153 | 3/1997 | Moulton et al. . |
| 5,552,243 | 9/1996 | Klein . | 5,618,641 | 4/1997 | Arias . |
| 5,556,576 | 9/1996 | Kim . | 5,619,417 | 4/1997 | Kendall . |
| 5,561,380 | 10/1996 | Sway-Tin et al. . | 5,620,808 | 4/1997 | Wheeler et al. . |
| 5,563,002 | 10/1996 | Harshe . | 5,622,789 | 4/1997 | Young . |
| 5,567,539 | 10/1996 | Takahashi et al. . | 5,623,196 | 4/1997 | Fernandez et al. . |
| 5,568,039 | 10/1996 | Fernandez . | 5,626,990 | 5/1997 | Miller et al. . |
| 5,569,063 | 10/1996 | Morioka et al. . | 5,631,537 | 5/1997 | Armstrong . |
| 5,569,550 | 10/1996 | Garrett et al. . | 5,633,573 | 5/1997 | van Phuoc et al. . |
| 5,573,869 | 11/1996 | Hwang et al. . | 5,637,981 | 6/1997 | Nagai et al. . |
| 5,582,931 | 12/1996 | Soichiro . | 5,643,044 | 7/1997 | Lund . |
| 5,585,207 | 12/1996 | Wakabe et al. . | 5,647,534 | 7/1997 | Kelz et al. . |
| 5,589,290 | 12/1996 | Klink et al. . | 5,648,713 | 7/1997 | Mangez . |
| 5,593,604 | 1/1997 | Beasly et al. . | 5,650,240 | 7/1997 | Rogers . |
| 5,594,320 | 1/1997 | Pacholok et al. . | 5,652,498 | 7/1997 | Edye et al. . |
| 5,595,835 | 1/1997 | Miyamoto et al. . | 5,652,502 | 7/1997 | van Phuoc et al. . |
| 5,595,839 | 1/1997 | Hossain . | 5,654,622 | 8/1997 | Toya et al. . |
| 5,599,636 | 2/1997 | Braun . | 5,670,272 | 9/1997 | Cheu et al. ............ 429/162 |
| 5,600,230 | 2/1997 | Dunstan . | | | |

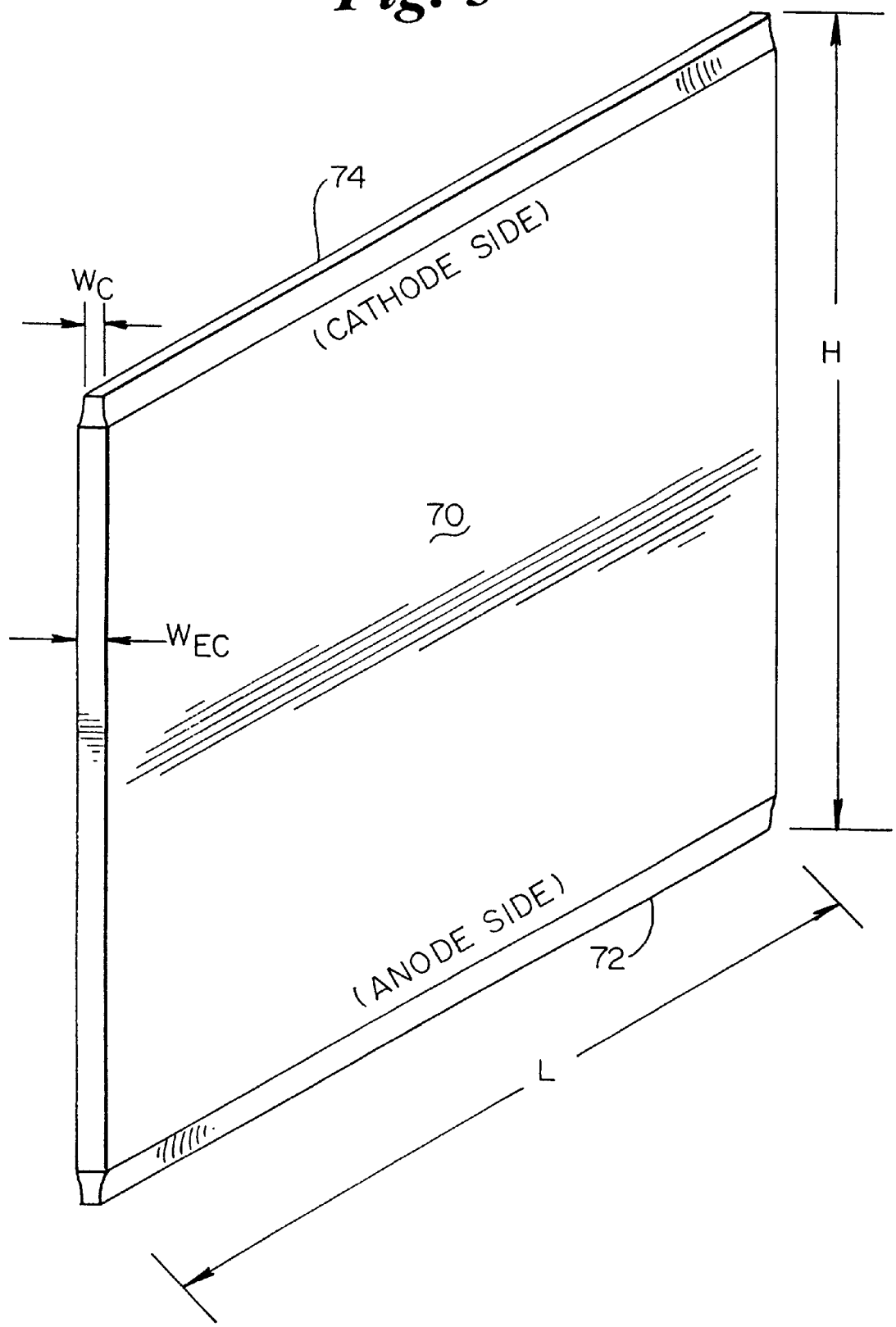

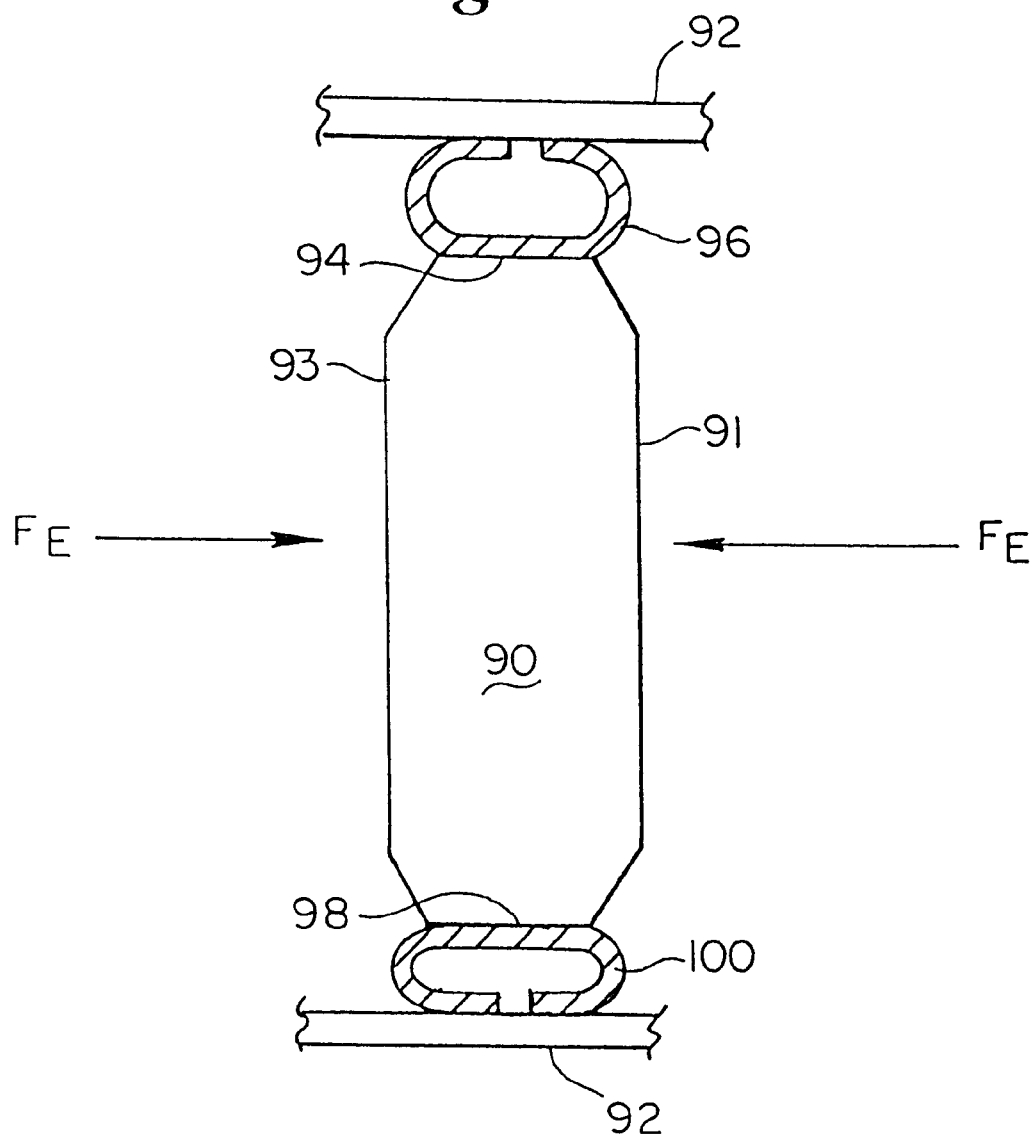

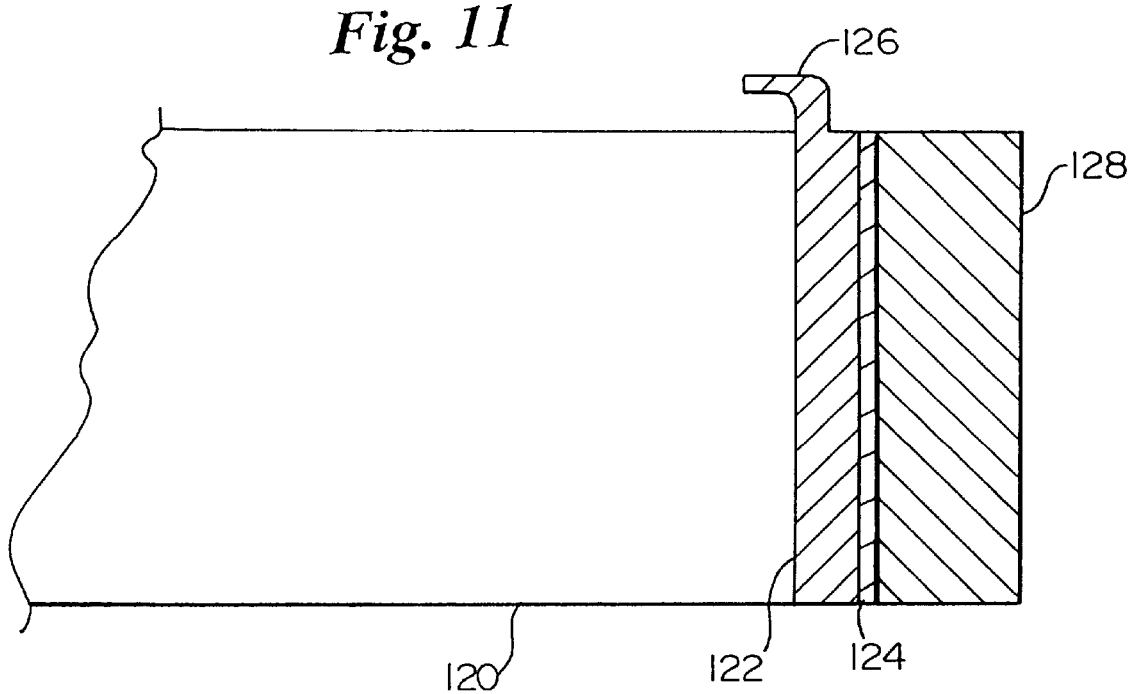

THERMAL CONDUCTOR FOR HIGH-ENERGY ELECTROCHEMICAL CELLS

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to energy storage devices, and more particularly, to a thermal conductor for use with high-energy electrochemical cells.

BACKGROUND OF THE INVENTION

The demand for new and improved electronic and electromechanical systems has placed increased pressure on the manufacturers of energy storage devices to develop battery technologies that provide for high energy generation in a low-volume package. A number of advanced battery technologies have recently been developed, such as metal hydride (e.g., Ni—MH), lithium-ion, and lithium polymer cell technologies, which would appear to provide the requisite level of energy production and safety margins for many commercial and consumer applications.

Such advanced energy storage systems, however, typically produce a significant amount of heat which, if not properly dissipated, can result in a thermal runaway condition and eventual destruction of the energy storage device, as well as the system being powered by the energy storage device. A conventional approach of providing a heat transfer mechanism external to a high-energy electrochemical cell or grouping of cells, for example, may be inadequate to effectively dissipate heat from internal portions of the cells. The severity of consequences resulting from short-circuit and thermal run-away conditions increases significantly as system voltage and current demands increase.

Other characteristics of advanced battery technologies provide additional challenges for the designers of advanced energy storage devices. For example, certain advanced cell structures are subject to cyclical changes in volume as a consequence of variations in the state of charge of the cell. Such repetitive changes in the physical size of a cell significantly complicates the electrical interconnection strategy and thermal/mechanical housing considerations.

There is a need in the advanced battery manufacturing industry for a methodology by which high-energy, highly exothermic electrochemical cells can be safely packaged for use in a wide range of applications. There exists a further need for a thermal management apparatus which accommodates the unique dynamics of an electrochemical cell which is subject to volumetric changes during charge and discharge cycling. The present invention fulfills these and other needs.

SUMMARY OF THE INVENTION

The present invention is directed to a thermal conductor for use with an electrochemical energy storage device. The thermal conductor is attached to one or both of the anode and cathode contacts of an electrochemical cell. A resilient portion of the conductor varies in height or position to maintain contact between the conductor and an adjacent wall structure of a containment vessel in response to relative movement between the conductor and the wall structure. The thermal conductor conducts current into and out of the electrochemical cell and conducts thermal energy between the electrochemical cell and thermally conductive and electrically resistive material disposed between the conductor and the wall structure.

The thermal conductor may be fabricated to include a resilient portion having one of a substantially C-shaped, double C-shaped, Z-shaped, V-shaped, O-shaped, S-shaped, or finger-shaped cross-section. An elastomeric spring element may be configured so as to be captured by the resilient conductor for purposes of enhancing the functionality of the thermal conductor. The spring element may include a protrusion that provides electrical insulation between the spring conductor and a spring conductor of an adjacently disposed electrochemical cell in the presence of relative movement between the cells and the wall structure. The thermal conductor may also be fabricated from a sheet of electrically conductive material and affixed to the contacts of a number of electrochemical cells.

BRIEF DESCRIPTION OF THE DRAWINGS

FIG. 3 is an illustration of another embodiment of an electrochemical cell having a prismatic configuration;

FIG. 9 is a top view of an electrochemical cell including anode and cathode conductor contacts constrained between substantially planar wall structures of a containment vessel;

FIG. 11 is a cross-sectional view of an electrochemical cell having a thermal conductor disposed adjacent a wall structure of an enclosure, the wall structure having a surface treatment or separate film material disposed thereon which exhibits good thermal conductance and poor electrical conductivity characteristics;

DETAILED DESCRIPTION OF THE EMBODIMENTS

Figure 1:
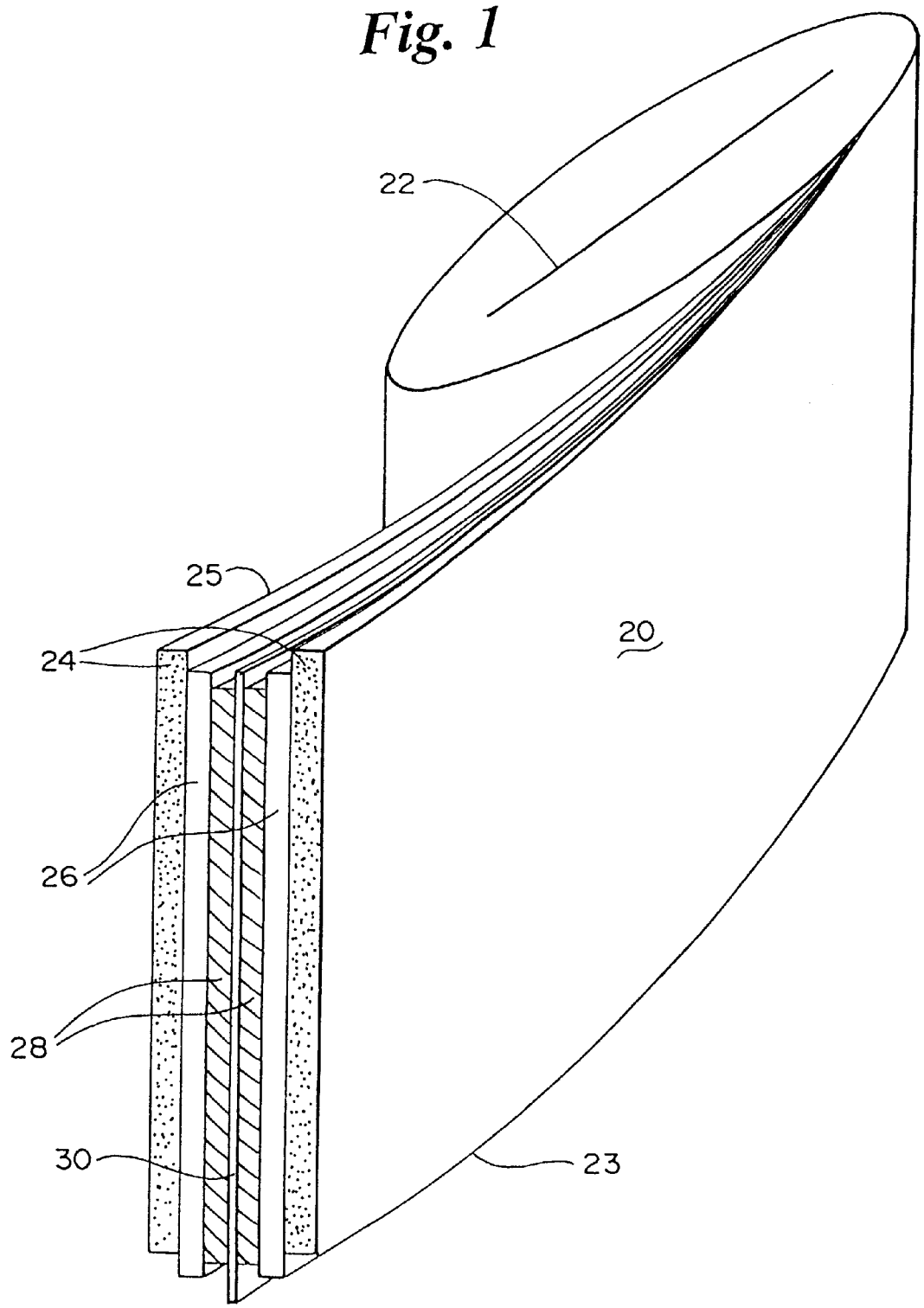
FIG. 1 illustrates an embodiment of a solid-state, thin-film electrochemical cell having a prismatic configuration.

Referring to the drawings, and more particularly to FIG. 1, there is illustrated an embodiment of a solid-state, thin-film electrochemical cell which may be utilized in the fabrication of a rechargeable electrochemical cell for use in a wide range of applications. In accordance with the embodiment illustrated in FIG. 1, the electrochemical cell 20 is shown as having a flat wound prismatic configuration in which a thin-film solid electrolyte 26 is disposed between a film 24 constituting an anode and a film 28 constituting a cathode.

A central cathode current collector film 30 is disposed between each of the cathode films 28 to form a bi-face cell configuration. A mono-face cell configuration may alternatively be employed in which a single cathode current collector 30 is associated with a single anode/electrolyte/cathode element combination. In this configuration, an insulating film is typically disposed between individual anode/electrolyte/cathode/collector element combinations. The anode films 24 are laterally offset relative to the cathode current collector 30 so as to expose the anode 24 along a first edge 25 of the cell 20, and to expose the cathode current collector 30 along a second edge 23 of the cell 20. The embodiment shown in FIG. 1 includes a core element 22, such as a foam or metal spring element, about which the thin-film electrochemical cell 20 is wound.

Figure 2A:
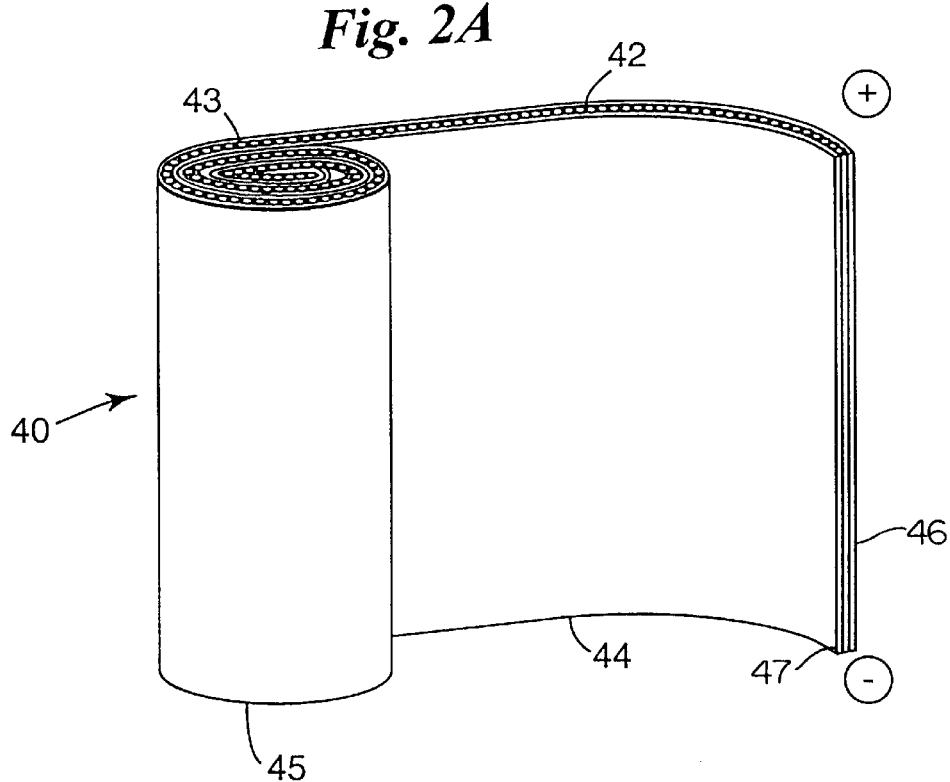
FIGS. 2A–2C illustrate various embodiments of a thin-film electrochemical cell.
Figure 2B:
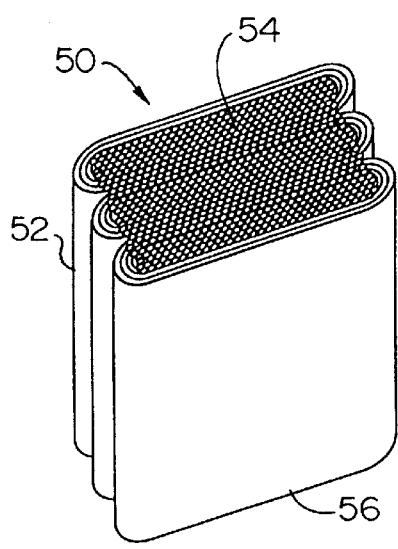
Figure 2C:
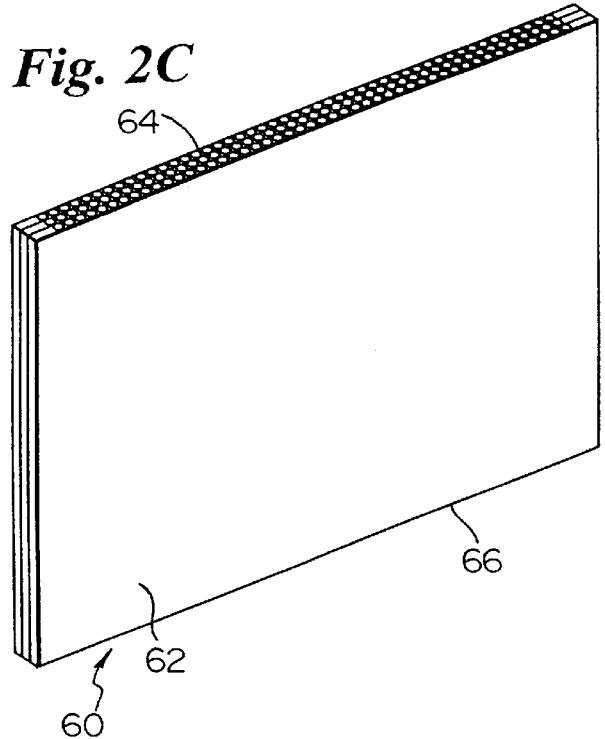

In FIGS. 2A–2C, there is illustrated various embodiments of a thin-film electrochemical cell which may be used in the fabrication of a rechargeable electrochemical energy storage device. As is shown in FIG. 2A, a thin-film electrochemical cell may be packaged in a "jelly roll" configuration so as to form a generally cylindrical cell structure in which a first edge 42 of the cell forms a positive contact 43, and a second edge 44 forms a negative contact 45. The positive and negative contacts 43, 45 are formed typically by use of a known metal spraying technique.

FIGS. 2B and 2C illustrate alternative packaging configurations for a thin-film rechargeable electrochemical cell. A flat roll configuration, shown in FIG. 2B, or a flat stack configuration, shown in FIG. 2C, provides for the aggregation of a relatively large thin-film cell surface area within a relatively small packaging configuration. Such geometries minimize $I^2R$ losses and allow for the efficient transfer of heat to and from the multi-layered cell structure. It is to be understood that various electrochemical cell configurations other than those depicted in the figures may be appropriate to meet the electrical, mechanical, and thermal requirements of a particular application.

In accordance with one embodiment, and with reference to FIG. 1, the electrochemical cell 20 includes a solid polymer electrolyte 26 which constitutes an ion transporting membrane, a lithium metal anode 24, and a vanadium oxide cathode 28. These film elements are fabricated to form a thin-film laminated prismatic structure, which may include an insulation film such as polypropylene film. A known sputtering metallization process is employed to form current collecting contacts along the edges 25, 23 of the anode and cathode current collecting films 24, 30, respectively. It is noted that the metal-sprayed contacts provide for superior current collection along the length of the anode and cathode film edges 25, 23, and demonstrate good electrical contact and heat transfer characteristics.

In general, the active materials constituting the solid-state, thin-film electrochemical cell retain chemical and mechanical integrity at temperatures well beyond typical operating temperatures. For example, operating temperatures on the order of 180° C. may be tolerated. The electrochemical cells depicted generally in the figures may be fabricated in accordance with the methodologies disclosed in U.S. Pat. Nos. 5,423,110, 5,415,954, and 4,897,917.

Figure 4:
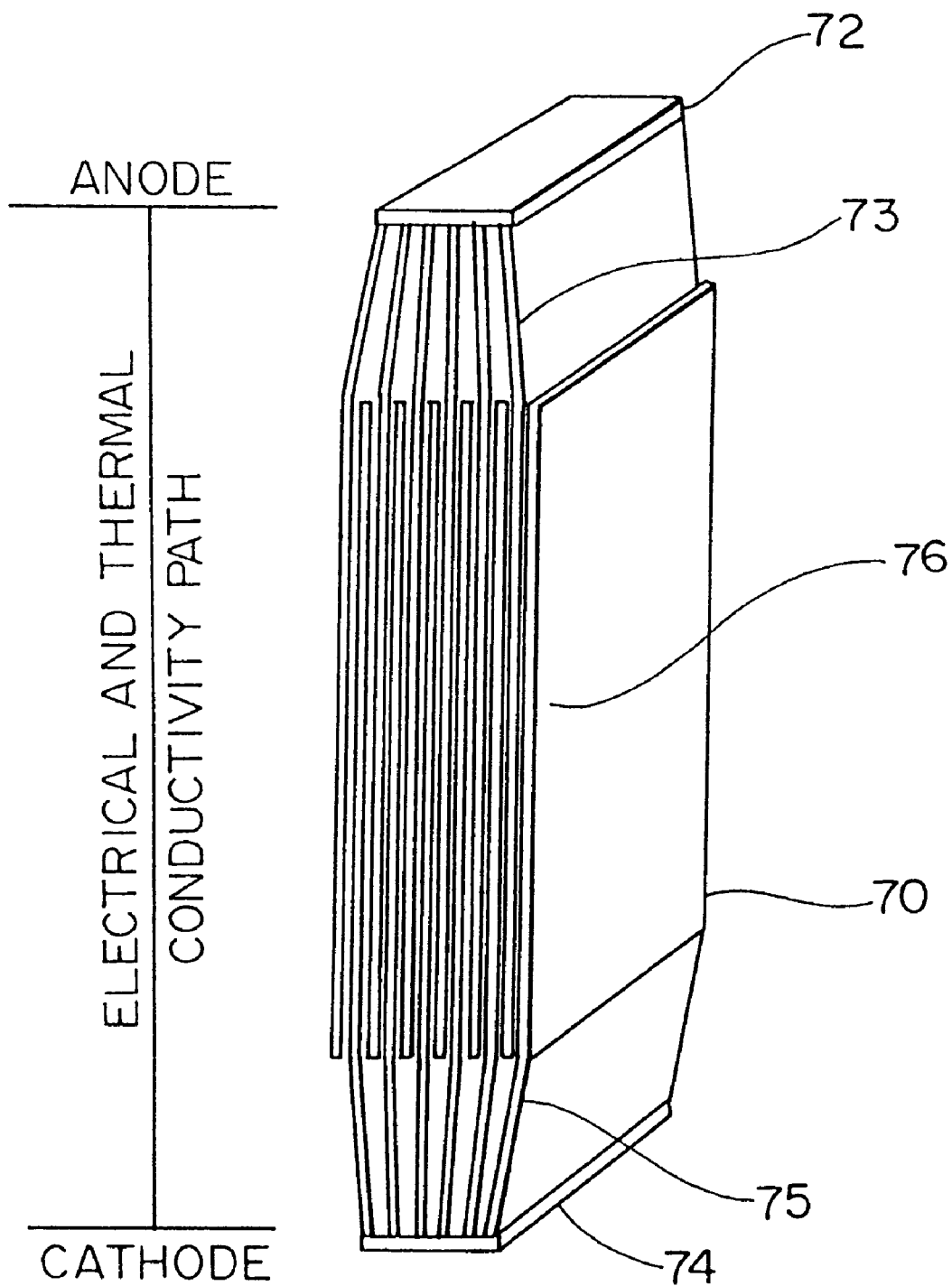
FIG. 4 provides a more detailed illustration of the anode and cathode contact regions of the electrochemical cell shown in FIG. 3.

Concerning FIGS. 3–4, there is shown an embodiment of a prismatic electrochemical cell 70 which includes an anode contact 72 and a cathode contact 74 formed respectively along opposing edges of the electrochemical cell 70. The electrochemical cell 70 shown in FIG. 4 illustrates the laterally offset anode and cathode current collecting film layers 73, 75 which terminate respectively at common anode and cathode contacts 72, 74. It is noted that a copper spraying technique is typically employed to form anode and cathode contacts 72, 74.

During charge and discharge cycling, electrical energy is conducted preferentially along the surfaces of the anode and cathode films 73, 75 and through the anode and cathode contacts 72, 74. During electrical discharge, the active portion 76 of the cell 70 produces an appreciable amount of thermal energy which is preferentially conducted along the anode and cathode film surfaces, thus sharing the same conductivity path as that for the electrical energy produced by the cell 70. As such, the contacts 72, 74 respectively disposed on the edge portions of the extended anode and cathode film layers 73, 75 provide a site for establishing both electrical and thermal connectivity with the cell 70.

The electrochemical cell shown in FIGS. 3–4 may be fabricated to have a length L of approximately 135 mm, a height H of approximately 149 mm, and a width $W_{ec}$ of approximately 5.4 mm or $W_{ec}$ of approximately 5.86 mm when including a foam core element 22. The width $W_c$ of the cathode contact 74 and the anode contact 72 is approximately 3.9 mm, respectively. A cell having these dimensions typically exhibits a nominal energy rating of approximately 36.5 Wh, a peak power rating of 87.0 W at 80 percent depth of discharge (DOD), a cell capacity of 14.4 Ah, and a nominal voltage rating of 3.1 volts at full charge.

In Table 1 below, various thermal properties are provided for an electrochemical cell maintained at a temperature of approximately 60° C. and having a structure similar to that illustrated in FIGS. 3–4. The tabulation of thermal conductivity values clearly demonstrates that the preferred thermal conductivity path is laterally along the surface of the film layers of the cell rather than axially through the film material.

TABLE 1

| | Thermal Conductivity (W/m° C.) | | | |
|---|---|---|---|---|
| Section | Direction of the film thickness | Direction of the connectors | Density (kg/m³) | Specific Heat (J/kg° C.) |
| Active Section | 0.4042 | 48.10 | 1356 | 1411 |
| Anode Side, | 0.0466 | 28.90 | 252 | 2714 |

TABLE 1-continued

| | | | | |
|---|---|---|---|---|
| Inactive Zone Cathode Side, Inactive Side | 0.0388 | 18.45 | 441 | 1470 |
| Complete Cell | | | 1218 | 1435 |

Other Components

| Component | Thermal Conductivity (W/m° C.) | Density x specific heat (kJ/m³° C.) |
|---|---|---|
| Cell's core (foam) | 0.071 | 401.3 |
| Metallization | 366.7 | 3254.6 |
| Spring-type conductor | 134.5 | 3254.6 |
| Vessel wall - anodized | 178.8 | 2566.9 |

Figure 5:
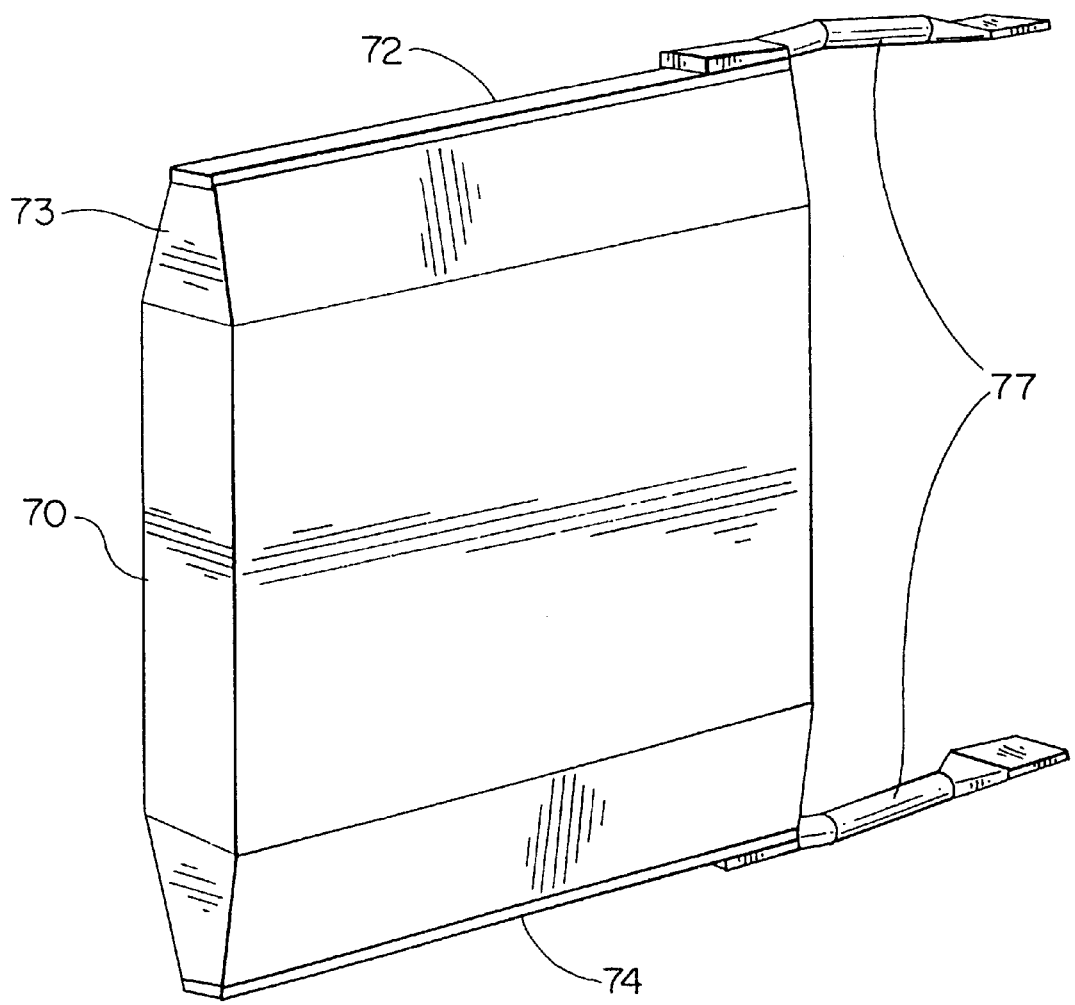
FIG. 5 is an illustration of an electrochemical cell including an electrical conductor attached to an end portion of the anode and cathode contacts of the cell, respectively.

Those skilled in the art will appreciate that a conventional approach of attaching an electrical lead 77 to an end portion of the anode and cathode contacts 72, 74, such as that illustrated in FIG. 5, would prove to be an inadequate configuration for effectively conducting heat into and out of the cell 70. Although this relatively long conductivity path would likely be satisfactory for purposes of conducting electrical current between the cell 70 and an external connection, such a configuration would be incapable of conducting a sufficient amount of thermal energy into or out of the cell 70 to ensure reliable and safe operation of the cell 70.

The problem of adequately managing the thermal and electrical conditions of a thin-film electrochemical cell is further complicated when multiple cells are situated in close proximity to one another, such as when forming a stack or bundle of cells. By way of example, and with reference to FIG. 6, a number of electrochemical cells 82 may be selectively interconnected in a parallel and/or series relationship to achieve a desired voltage and current rating. A number of the electrochemical cells 82 may be grouped together and connected in parallel to common positive and negative power conductors or terminals to form a cell pack 83. A number of the electrochemical cell packs 83 may then be connected in series to form a module 80. A number of modules 80 may be connected in series to constitute larger and more powerful energy producing battery configurations.

For example, and assuming that each of the electrochemical cells 82 has dimensions and characteristics equivalent to those depicted in FIGS. 3–4, each individual cell 82 provides for a total energy output of approximately 36.5 Wh. Each cell pack 83 provides for a total energy output of approximately 292 Wh, while each module 80 provides for a total energy output of 1.75 kWh. A battery (not shown), constituted by 24 series connected modules 80, provides for a total energy output of approximately 42 kWh.

Figure 7:
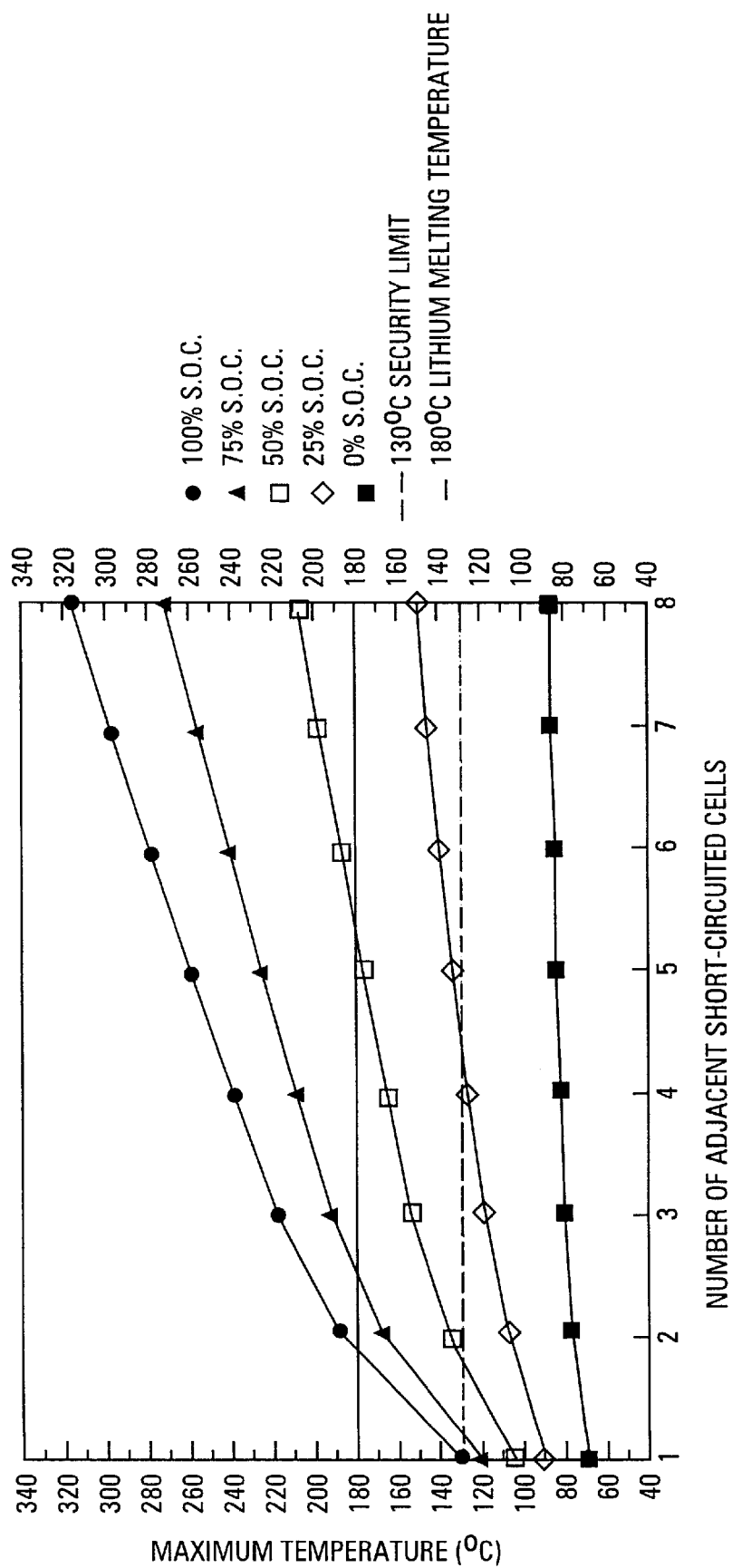
FIGS. 7 and 8 illustrate a relationship between the maximum temperature in a cell stack and the number of adjacent short-circuited cells with and without employment of an external thermal management scheme.
Figure 8:
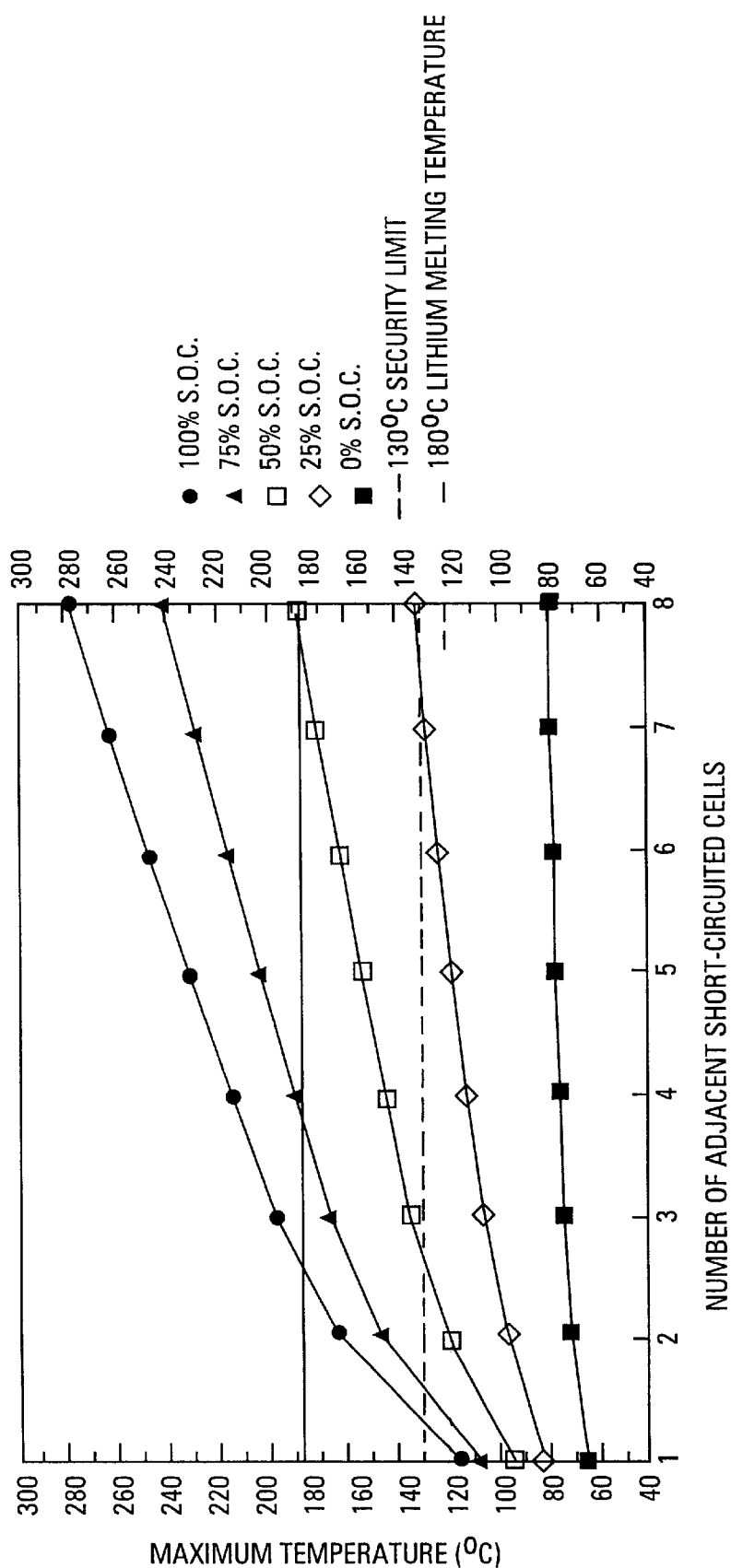

FIGS. 7–8 illustrate the effect of short-circuit conditions on cell temperature for a stack of cells in physical contact with one another. The graph shown in FIG. 7 illustrates a relationship between the maximum temperature in a cell stack as a function of the number of adjacent short-circuited cells when no external thermal management scheme is employed. Five plots of data corresponding to five state of charge (SOC) levels are depicted. FIG. 8 provides a similar plot of data with the exception that an external thermal management system is employed to enhance the transfer of heat out of the cells constituting the cell stack.

It is noted that the solid line provided at 180° C. represents the melting temperature of lithium, and that 130° C. is considered an upper security or safety limit. It is understood that the 130° C. limit is provided to demonstrate that a particular energy storing device may be designed to operate below a maximum temperature which may be different from a cell breakdown temperature.

The data presented in graphical form in FIGS. 7–8 demonstrates the significant impact of short-circuit conditions on cell stack temperature. The data plotted in FIG. 7 suggests that no greater than one short-circuited cell can be tolerated within a cell stack without jeopardizing the integrity of the stack, assuming that no external cooling apparatus is employed. Those skilled in the art will immediately appreciate the importance of providing for the efficient transfer of thermal energy out of a thin-film electrochemical cell in order to minimize the adverse effects of over-temperature conditions within a stack of closely situated cells.

Figure 6:
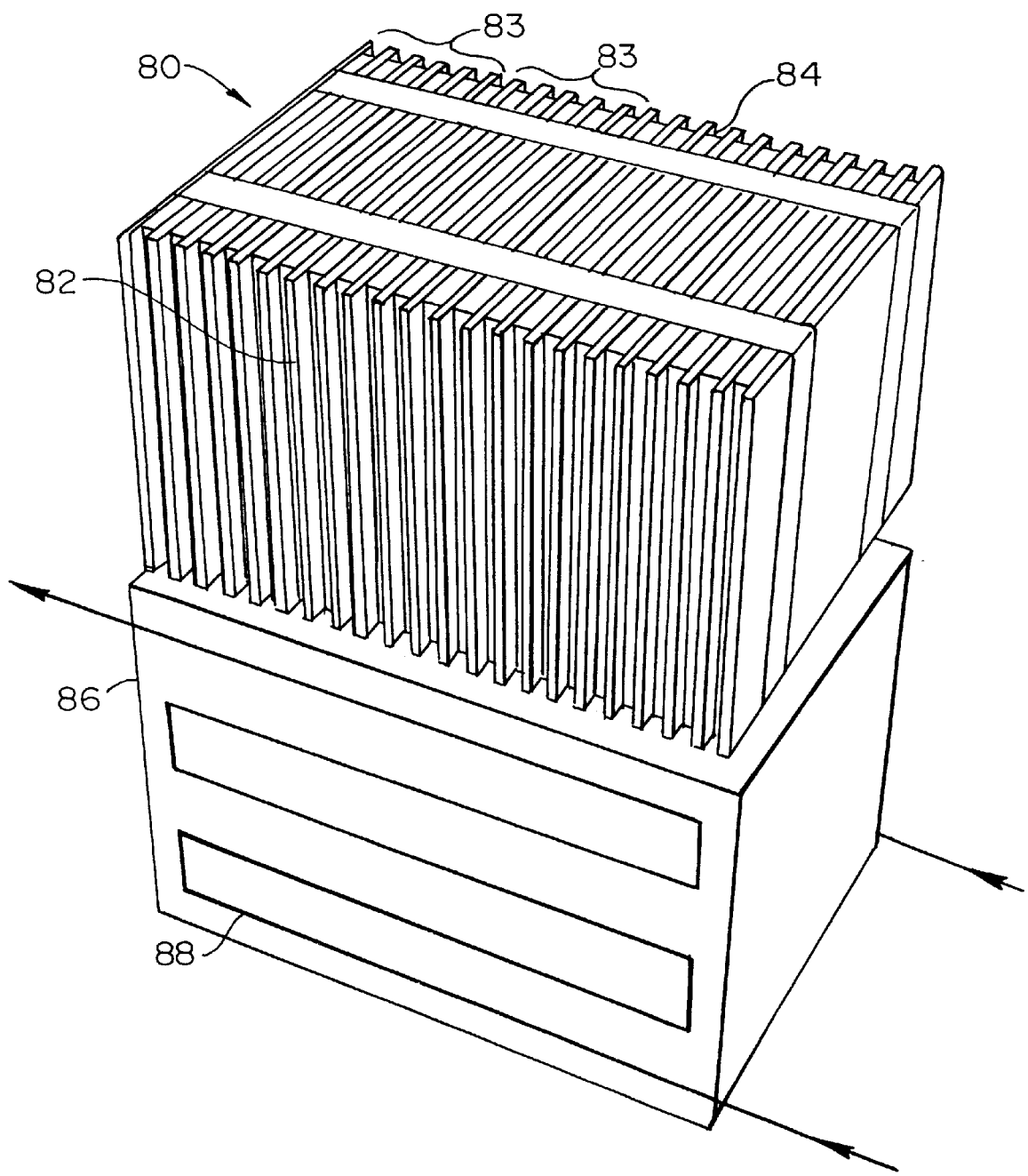
FIG. 6 is an illustration of an energy storage module including a stack of interconnected electrochemical cells.

The embodiment of an energy storage module 80 shown in FIG. 6 includes a stack 84 of electrochemical cells 82 which may be enclosed in a containment vessel 86 that typically includes a thermal management system. The containment vessel 86 is shown as including a serpentine fluid channel 88 within which a heat transfer fluid passes. Thermal energy may be transferred into or out of the cells 82 forming the stack 84 through use of an external thermal management system (e.g., cooling channels) in combination with a thermal conductor provided on either one or both of the anode and cathode contacts of individual cells.

It has been determined that an external thermal management system of the type shown in FIG. 6 may be employed in combination with a resilient thermal and electrical conductor constructed in accordance with the principles of the present invention to effectively regulate the internal temperature of a thin-film electrochemical energy storage device.

An additional factor that further complicates the effort to provide an effective thermal and electrical conduction apparatus for high-energy electrochemical cells concerns cyclical changes in cell volume that occur in various types of thin-film electrochemical cells. By way of example, the volume of an electrochemical cell of the type described previously with regard to FIG. 1 varies during charge and discharge cycling due to the migration of lithium ions into and out of the lattice structure of the cathode material. This migration creates a corresponding increase and decrease in total cell volume on the order of approximately five to six percent or more during charging and discharging, respectively.

It has been determined that the performance and service-life of such an electrochemical cell is significantly increased by maintaining the cell in a state of compression. Improved cell performance may be realized by maintaining pressure on the two larger opposing surfaces of the cell during cell cycling. It is considered desirable that the compressive forces, whether produced internally or externally of the cell, be distributed fairly uniformly over the surface of application.

In the embodiment illustrated in FIG. 9, for example, a cell 90 is shown as being constrained between substantially planar walls 92 of a containment structure. The cell 90 includes two opposing surfaces 91, 93 each having a large surface area relative to the surface area of the four edges of the cell 90. An external force, $F_E$, is applied to the opposing surfaces 91, 93 so as to maintain the cell 90 in a state of compression. The magnitude of the external force, $F_E$, typically ranges between approximately 5 psi to 100 psi during charge/discharge cycling.

It is understood that the external force, $F_E$, may be maintained at a constant magnitude, such as 20 psi for example, or may vary between a minimum and a maximum value, such as between approximately 5 and 100 psi. Further, the external force, $F_E$, may be produced by contact between one surface 91 of the cell 90 and an active force generation mechanism, while the opposing surface 93 is restricted from movement by a stationary structure. Alternatively, an active force generating mechanism may be applied to both opposing surfaces 91, 93 of the electrochemical cell 90.

A resilient thermal and electrical conductor constructed in accordance with the principles of the present invention advantageously provides for effective conduction of thermal and electrical energy to and from a thin-film electrochemical cell which is subject to cyclical volumetric variations over time. As is illustrated in the embodiment of FIG. 10A, an electrochemical cell 100 includes a thermal conductor 102 which is spot welded or otherwise attached to each of the anode and cathode contacts 104, 106, respectively. A thermal conductor 102 is typically disposed along the length of the anode contact 104 and the cathode contact 106, and typically includes an electrical connection lead 108 for conducting current into and out of the electrochemical cell 100, the current being collected and conducted along the anode and cathode contacts 104, 106.

In addition, the thermal conductor 102 provides a thermal flux path for efficiently transferring thermal energy between the cell 100 and a thermally conductive, electrically resistive material or structure disposed adjacent the cell 100. It is to be understood that a thermally conductive, electrically resistive material or structure as described herein refers to a surface coating/treatment or separate material that permits a sufficient amount of heat to be conducted therethrough, yet is electrically resistive to the flow of current relative to a current path provided for conducting current into and out of an electrochemical cell. An anodized coating, for example, may have a thickness that permits a sufficient amount of thermal energy to be conducted therethrough, yet is sufficiently resistive to electrical current relative to the anode and cathode contacts or the thermal conductor. By way of further example, a thermally conductive polymer element may be employed, with the density of thermally conductive particles impregnated therein being selected to provide a desired balance between thermal and electrical conductivity characteristics.

The thermal conductor 102 is configured so as to exhibit a spring-like character which provides for substantially continuous contact between the cell 100 and a stationary structure, such as a metallic wall surface, disposed adjacent the cell 100 in the presence of relative movement between the cell 100 and the wall structure. It is noted that the thermal conductor 102 or other thermal conductor that effects the transfer of heat between the cell 100 and a thermally conductive structure or material adjacent the cell 100 may be utilized along only one or both of the anode and cathode contacts 104, 106.

Figure 10B:
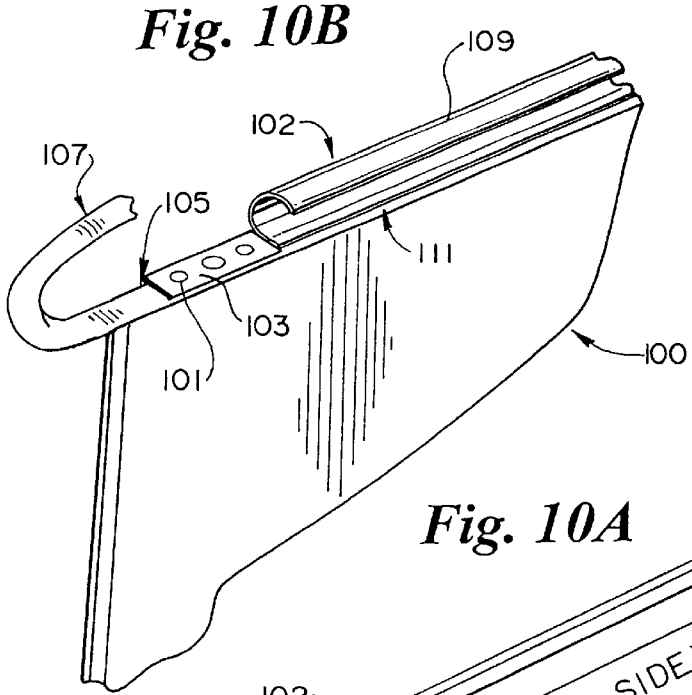
FIGS. 10A–10B illustrate an embodiment of a prismatic electrochemical cell including a pair of thermal conductors respectively attached to the anode and cathode contacts of the cell.
Figure 10A:
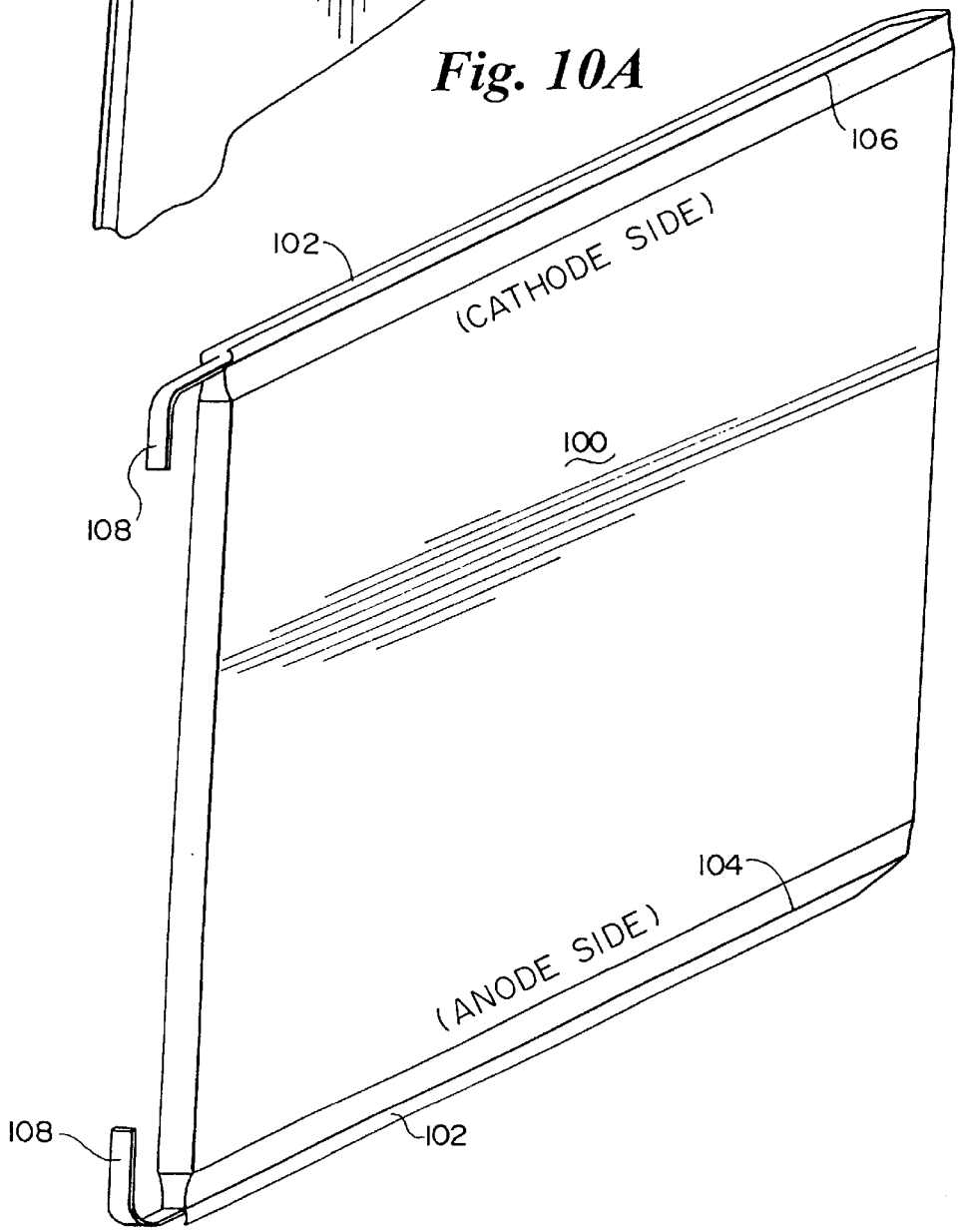

By way of example, and with reference to the embodiment of the thermal conductor shown in FIG. 10B, the thermal conductor 102 includes a copper tab 103 that extends along the length of a sprayed metal anode or cathode contact 111. The copper tab 103 includes a resilient member 109 through which heat is transferred between the cell 100 and an adjacently disposed heat sink, such as a wall of a metallic housing. The copper tab 103 is spot welded to the sprayed metal contact 111 at a number of weld locations 101. A flexible electrical lead 107 is ultrasonically welded at a location 105 toward the end of the copper tab 103. Current is conducted primarily along the sprayed metal contact 111 of the cell 100 and communicated to external connections via the flexible electrical leads 107.

In general, a thermal conductor that provides the above-described thermal, electrical, and mechanical advantages should be fabricated from a material which has a relatively high thermal and electrical conductivity. The material should have good surface characteristics for establishing contacts with both a separate planar support surface and an integral metallization layer formed on the anode or cathode contacts of the electrochemical cell.

The material used to fabricate the thermal conductor contacts should have a relatively low force of compression so as to avoid damaging the edges of the cell or the surface of the wall structures adjacent the cell. Also, the thermal conductor contacts should be configured to minimize the length of the thermal flux path, yet maximize the cross-sectional area in order to optimize the heat transfer characteristics of the thermal conductor contacts. A suitable material for use in the fabrication of a thermal conductor having the above-described characteristics is pure copper, although other metals and alloys may be employed.

In FIG. 11, there is shown a side cross-sectional view of an electrochemical cell 120 including a thermal conductor 122 situated adjacent a wall 128 of a containment vessel having a coating of thermally conductive, electrically resistive material 124. In this configuration, the thermal conductor 122 conducts current into and out of the electrochemical cell 120, and includes a lead portion 126 which provides for convenient connectivity to an external energy consuming element and to a charging unit.

Current is conducted along the low electrical resistivity path defined by the thermal conductor 122 and the lead 126 in preference to the high electrical resistivity path defined by the thermal conductor 122 and the material 124 disposed on the wall 128 of the containment vessel. The thermal conductor 122 further provides a thermal flux path through which thermal energy is efficiently transferred between the cell 120 and the wall 128 of the containment vessel coated with a thermally conductive material 124.

In one embodiment, the thermally conductive material 124 may constitute an anodized aluminum coating developed on the surface of an aluminum casing or other structure 128. A conformal plastic coating may be applied over the anodized surface. In the case of a stainless steel housing, a thin sheet of plastic or mineral-based material may be disposed adjacent the wall 128 of the containment vessel. The thermally conductive coating 124, which may alternatively constitute a compliant thermal compound or material, provides for the transferring of thermal energy between the cell 120 and the thermally conductive material 124, yet is sufficiently electrically resistive to ensure that current is conducted preferentially along the anode and cathode contacts of the cell 120 and the lead 126 of the thermal conductor 122.

Figure 12:
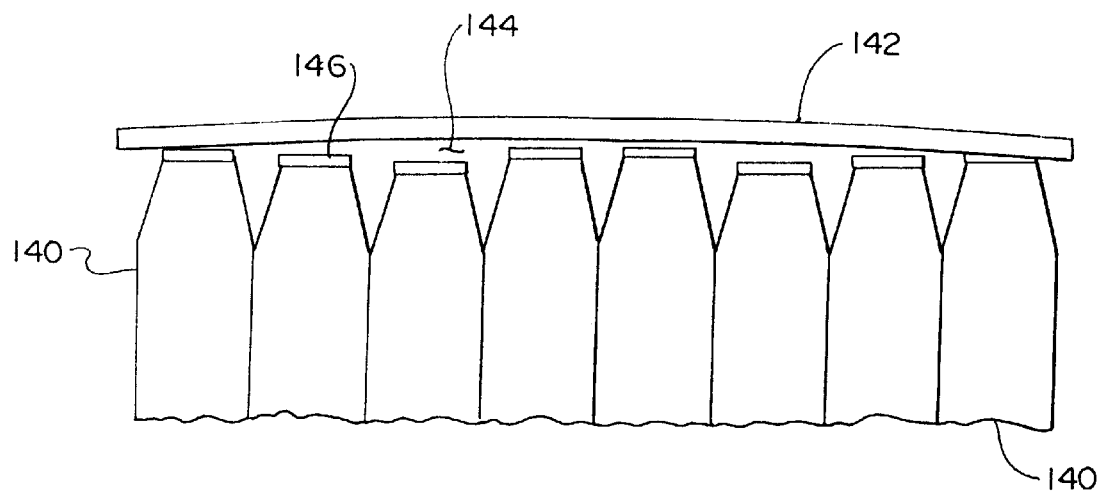
FIG. 12 is a top view illustration of a grouping of electrochemical cells aligned such that the cell contacts are situated adjacent a wall of a containment vessel, a number of gaps being developed between some of the cell contacts and the wall due to variations in cell length and wall warpage.
Figure 13:
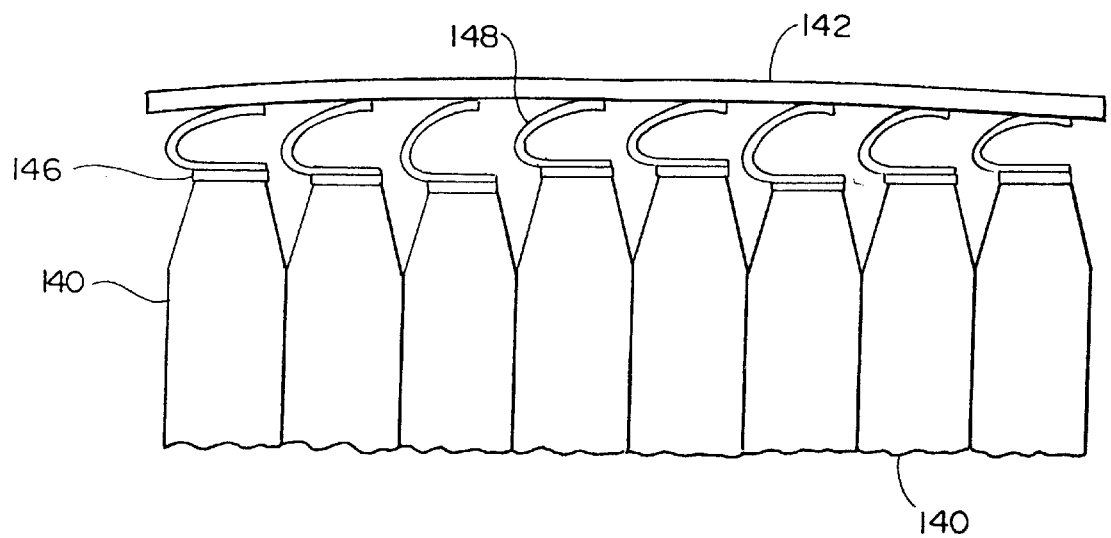
FIG. 13 is a top view illustration of an embodiment of a thermal conductor which varies in height or position to maintain mechanical engagement with the wall of a containment vessel.

It can be appreciated that continuous contact between the thermal conductor and an adjacently disposed thermally conductive surface or material is imperative to achieve good thermal conductance between the electrochemical cell and an external thermal management system. In FIGS. 12–13, there is depicted an aggregation of electrochemical cells 140 which typically vary in dimension depending on allowable manufacturing and assembly tolerances. Because of such variations and vessel wall warpage, or other imperfections inherent or induced in the wall 142 of a containment vessel, a number of gaps 144 will typically develop between the vessel wall 142 and a number of the electrochemical cells 140.

It is understood that thermal conductance is severely reduced upon the occurrence of a gap 144 forming between a cell contact 146 and the vessel wall 142. Although a compliant thermal compound may improve thermal conductance in the presence of small gaps 144, such compounds are generally ineffective for maintaining thermal conductance across large gaps 144.

In general, the thermal conductor contacts 148 are formed to provide a relatively high degree of dimensional take-up in order to accommodate assembly tolerances when installing the electrochemical cells 140 between substantially stationary support structures 142 of a containment vessel. The thermal conductor contacts 148 also exhibit a relatively high degree of spring-back to accommodate possible wall deflections and variations in the separation distance between the cells 140 and a wall structure 142 over time.

Figure 14A:
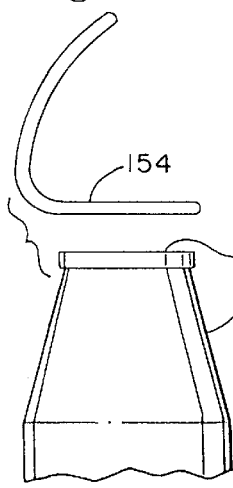
FIGS. 14A–14D illustrate the spring-like characteristics of a thermal conductor.

In the embodiment shown in FIGS. 14A–14D, a thermal conductor 154 is formed to include a substantially C-shaped portion which exhibits good dimensional take-up and spring-back properties. In FIG. 14A, the thermal conductor 154 is shown in a relaxed state prior to attachment to a contact 152 of an electrochemical cell 150. The relaxed state of the thermal conductor 154 aids in the process of attaching the thermal conductor 154 to the cell. After the thermal conductor 154 is attached to the cell contact 152, a wiping procedure is typically performed on the thermal conductor 154 to ensure that the thermal conductor 154 will collapse properly when installed in a compressed state between the walls of a constraining structure.

Figure 14B:
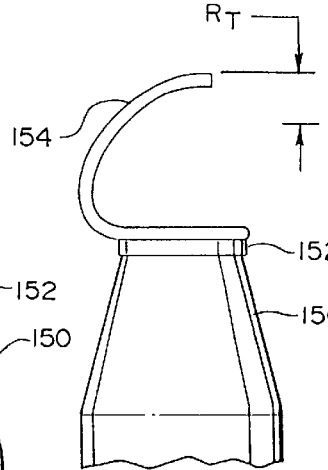
Figure 14C:
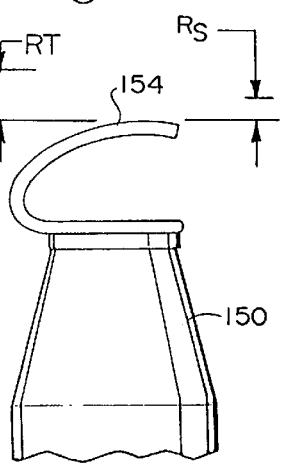
Figure 14D:
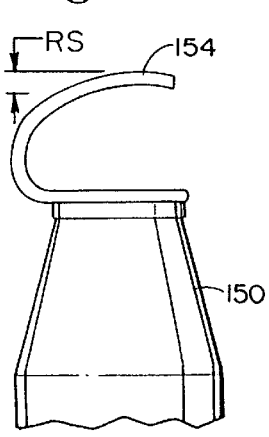

A pre-installation configuration of the thermal conductor 154 is shown in FIG. 14B. In FIG. 14C, the thermal conductor 154 is shown in a compressed state which would typically arise when the cell 150 is installed between the walls of a constraining structure. The take-up range, $R_T$, represents the total distance in which the thermal conductor 154 may be compressed without significantly reducing its spring-back properties. FIG. 14D illustrates the spring-back property of the thermal conductor 154 that would be implicated in response to relative movement between the cell 150 and the walls of a constraining structure abutting the thermal conductor 154. The magnitude of the spring-back displacement in this illustrative example is depicted as the dimension $R_S$.

The thermal conductor 154 shown in FIGS. 14A–14D provides for spring-back in the range of approximately 1–3 mm, which is sufficiently large to compensate for relative movement of approximately 1–3 mm between the electrochemical cell and an adjacent wall structure. It is noted that a thermal conductor having a substantially C-shaped cross-section and a nominal height value of approximately 3 mm varies in thermal conductance as a function of height variation, due to changes in the area of contact between the thermal conductor and the adjacent wall.

For example, it has been demonstrated that a height variation of ±0.5 mm results in a corresponding conductance change ranging between approximately 450–575 W/m²C. The conductance of a non-compressed thermal conductor having a nominal height of 3 mm, without introduction of a thermally conductive compound, is approximately 200 W/m²C. Introducing a compliant thermal compound may improve the conductance characteristics of the thermal conductor during compression and extension of the conductor.

Figure 15:
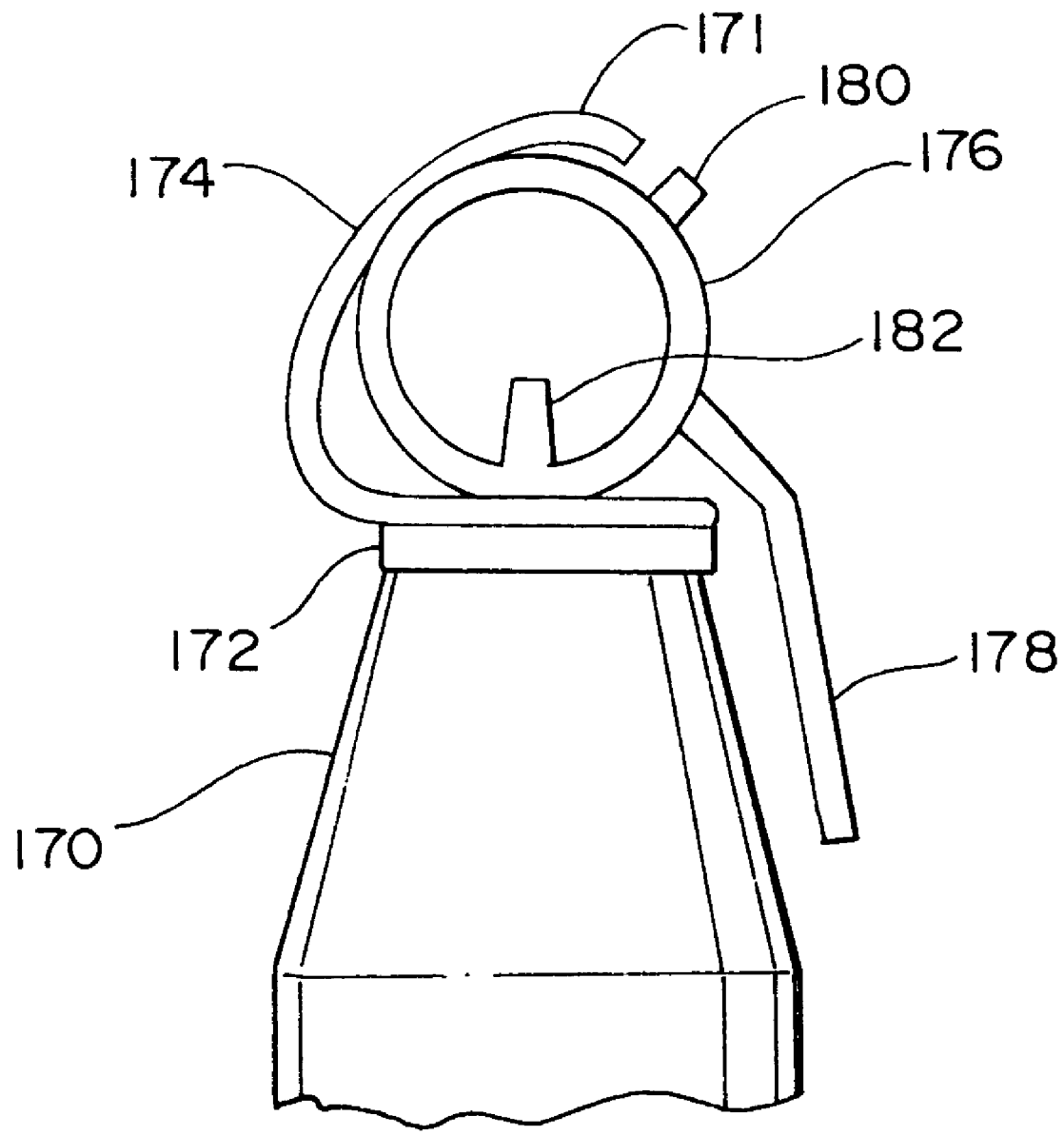
FIG. 15 is an illustration of a spring insulator captured within a thermal conductor that enhances the spring-like properties of the thermal conductor.
Figure 16:
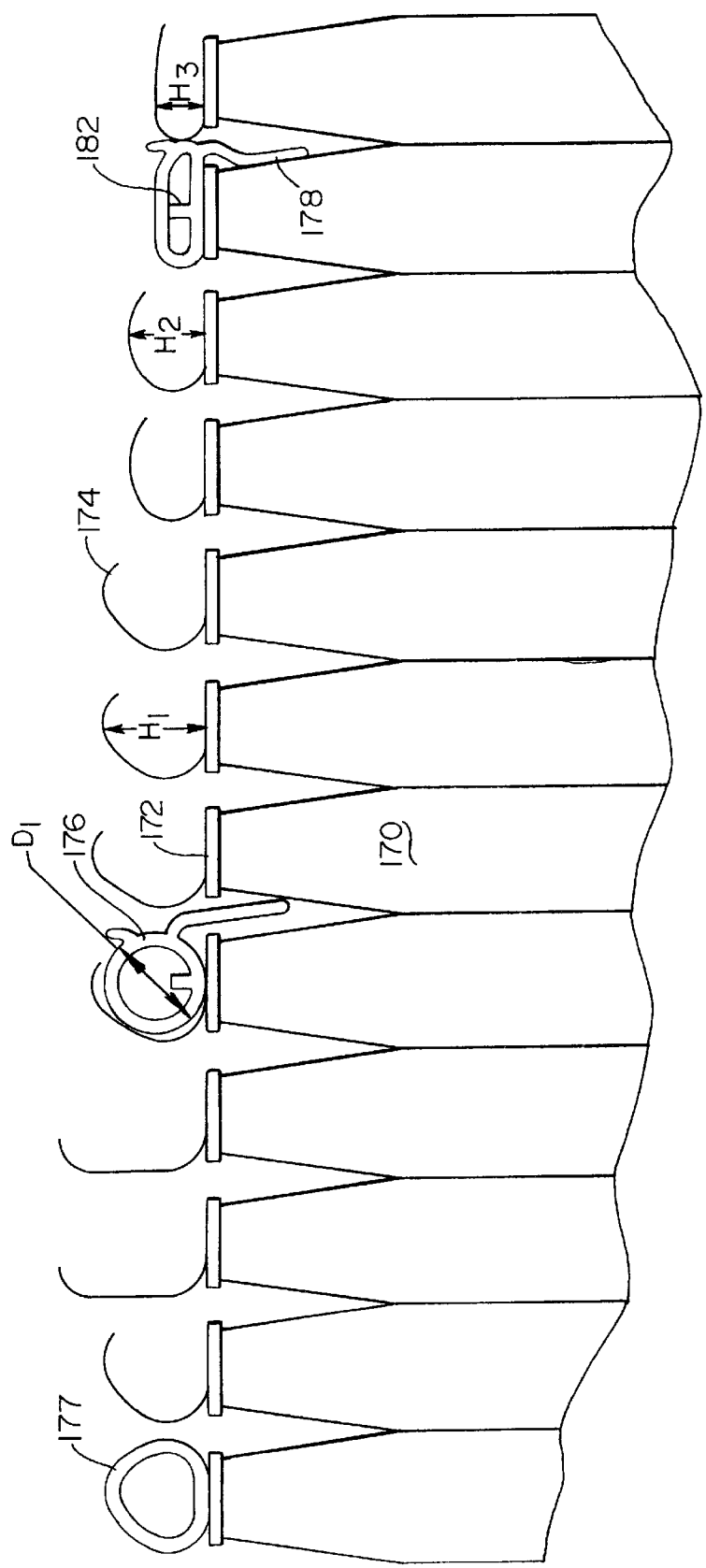
FIG. 16 illustrates various configurations of a thermal conductor, including a spring insulator, in compressed and uncompressed states.

Concerning FIGS. 15–16, there is illustrated an alternative embodiment of a thermal conductor having a substantially C-shaped cross-section and including an elastomeric spring element retained within the thermal conductor. The elastomeric spring element generally improves the spring-back characteristics of the thermal conductor, and may be fabricated using stock materials, such as cylindrical elastomeric tubing 177 or thermally conductive foam. Alternatively, a more complex spring element may be fashioned from elastomeric material. The thermal conductor 174 includes a hooked-tip 171 which retains the elastomeric spring element 176/177 within the thermal conductor structure.

The elastomeric spring 176 may include an insulating protrusion 178 and an insulating stub 180 which provides electrical isolation for the thermal conductor 174 and contact 172 with respect to the conductors and contacts of adjacent cells 170. Additionally, a stop 182 may be included to prevent over-collapsing or possible crushing of the thermal conductor 174. FIG. 16 illustrates the dynamic insulating capability of the elastomeric spring 176 when transitioning between uncompressed and compressed states.

In this embodiment, the thermal conductor 174 has a height, $H_1$, of approximately 4 mm at an initial compressed state. Under moderate compression, the thermal conductor 174 has a height, $H_2$, of approximately 3 mm. When the thermal conductor 174 is at a fully compressed state such that the stop 182 contacts the inner surface of the upper portion of the spring 176, the conductor 174 has a height of approximately 2 mm. The spring elements 176/177 each have a diameter, $D_1$, of approximately 3.8 mm.

Figure 17:
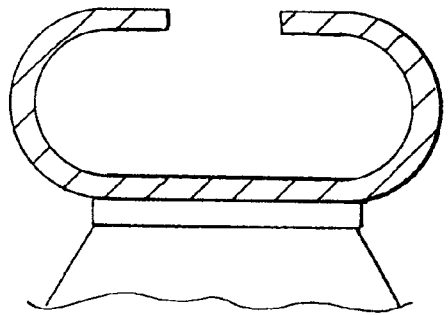
FIGS. 17–22 illustrate additional embodiments of a thermal conductor.
Figure 18:
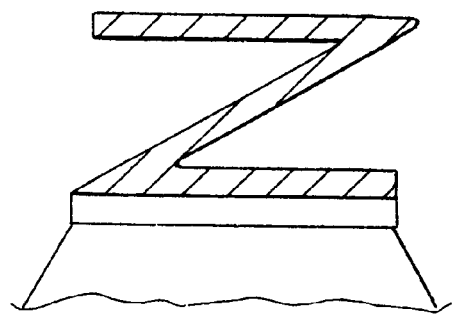
Figure 19:
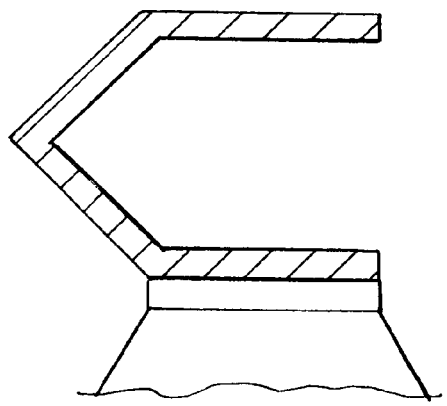

It is understood that a thermal conductor which exhibits the mechanical, thermal, and electrical characteristics described herein may be formed to include spring-like portions having configurations that differ from those illustrated herein. By way of example, three other embodiments of a thermal conductor well-suited for use with prismatic electrochemical cells are shown in FIGS. 17–19. These embodiments provide for the efficient transfer of electrical current and thermal energy into and out of a prismatic electrochemical cell.

Figure 20:
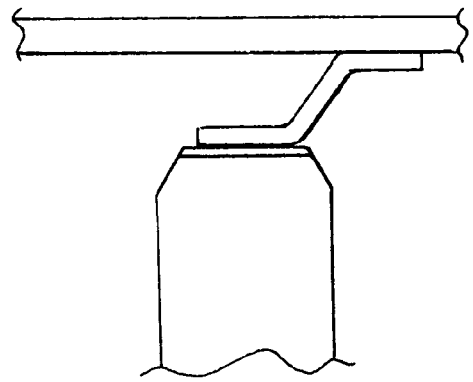
Figure 21:
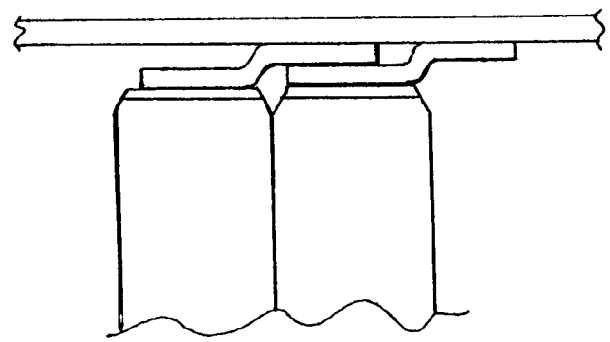
Figure 22:
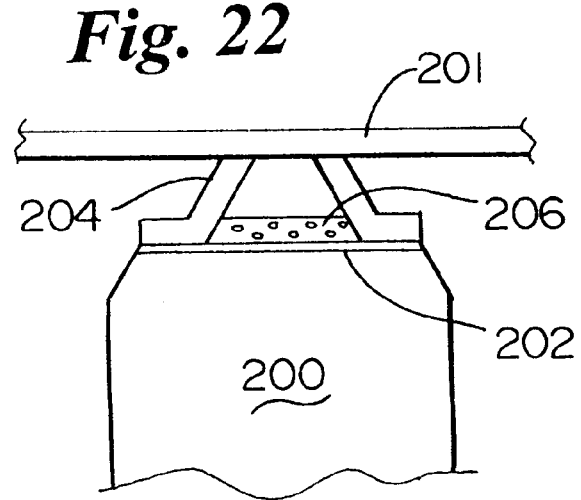

The thermal conductor shown in FIG. 17 is formed to include a substantially double C-shaped portion which permits the thermal conductor to collapse and expand in a spring-like manner. Z-shaped, V-shaped, and S-shaped thermal conductor contacts are respectively shown in FIGS. 18–20 which, as with the other illustrative embodiments described above, expand and collapse to accommodate dimensional variations and positional shifting between the cell and the walls of a structure constraining the cell. A stacked S-shaped thermal conductor configuration is shown in FIG. 21 which advantageously increases the number of thermal conduction paths between the cell and an adjacent heat sink. FIG. 22 illustrates another embodiment of a thermal conductor which includes two finger-shaped or bent L-shaped resilient conductors 204 affixed to the sprayed metal contact 202 of the cell 200. An elastomeric element 206 is situated between the collapsible finger-shaped conductors 204 to prevent over-collapsing of the conductors 204.

Figure 23:
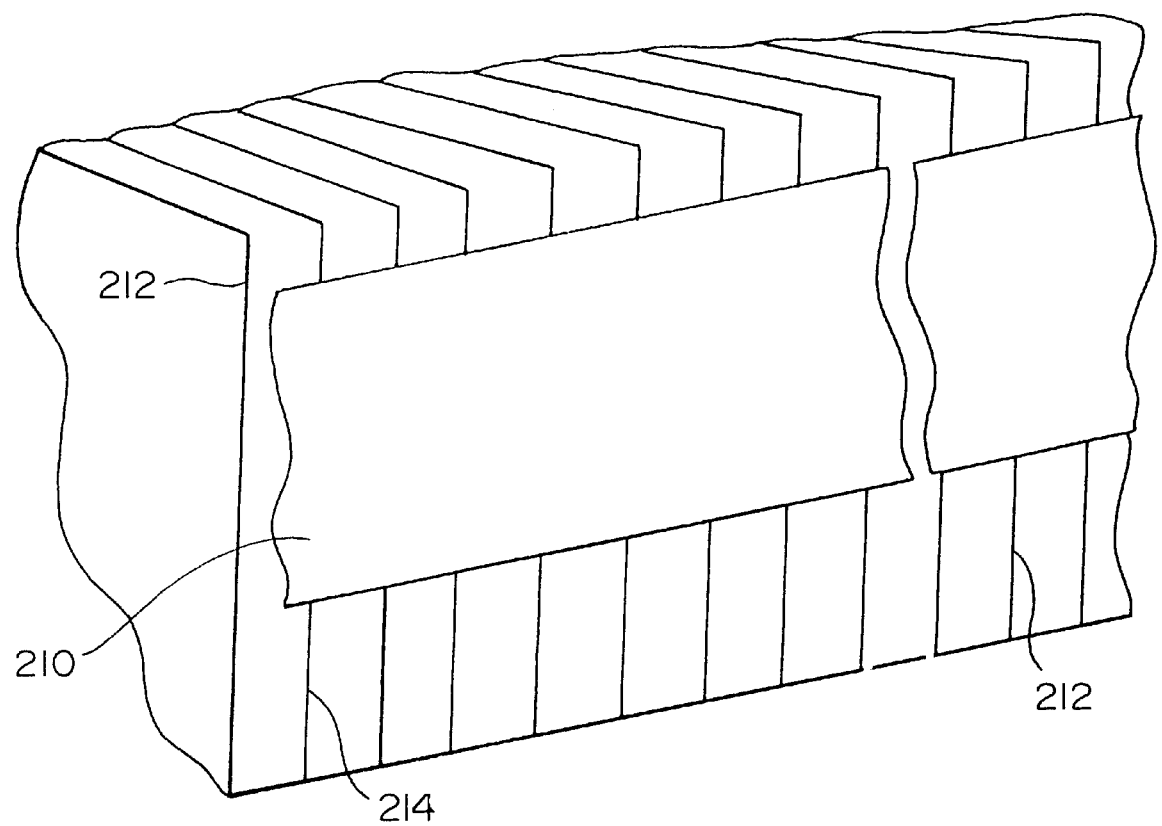
FIG. 23 is an illustration of a thermal conductor that spans across a number of electrochemical cell contacts.

FIG. 23 illustrates another embodiment of a thermal conductor which may be applied to a number of electrochemical cells 212. The thermal conductor 210 is configured as a flat sheet of metallic or other electrically conductive material. In this embodiment, the thermal conductor 210 spans across the anode and/or cathode current collecting contacts 214 of a number of cells 212. It can be seen that the thermal conductor 210 connects a number of the cells 212 in parallel, such as eight cells 212 that form a cell pack for example. Current is conducted along the thermal conductor 210 and transferred into and out of the parallel connected cells via an electrical contact or lead (not shown) attached to the thermal conductor 210. Heat is transferred through the thermal conductor 210 and to a heat sink, such as the wall of a metallic enclosure, disposed adjacent the thermal conductor 210. A thin sheet of plastic or mica, for example, may be situated between the thermal conductor 210 and the heat sink. Alternatively, the heat sink may be treated to include an anodized surface or other electrically resistive, thermally conductive material.

In yet another embodiment of a thermal conductor in accordance with the present invention, and as best shown in FIG. 4, the thermal conductor comprises a number of laterally offset anode and cathode film layers 73, 75 and the anode and cathode contacts 72, 74. In this embodiment, one or both of the anode and cathode contacts 72, 74 may directly engage the thermally conductive, electrically resistive material disposed on the wall of a containment vessel. The resilient portion of the thermal conductor constitutes the laterally offset anode and cathode film layer 73, 75 which flex in response to relative movement between the cell and the vessel wall.

It will, of course, be understood that various modifications and additions can be made to the embodiments described hereinabove without departing from the scope or spirit of the present invention. For example, discrete surfaces, rather than the entire surface, of a heat sink, such as a metallic wall of a protective enclosure, may be subject to application of the above-described thermally conductive and electrically resistive material. By way of further example, a thermal conductor constructed in accordance with the principles of the present invention may be employed in connection with battery technologies other than those involving lithium polymer electrolytes, such as those employing nickel metal hydride (Ni—MH), lithium-ion, (Li-Ion), and other high energy battery technologies. Accordingly, the scope of the present invention should not be limited by the particular embodiments discussed above, but should be defined only by the claims set forth below and equivalents thereof.

What we claim is:

1. An energy storage device, comprising:
   a thin-film electrochemical cell having an anode contact and a cathode contact; and
   a conductor coupled to the anode contact or the cathode contact and including a resilient portion for maintaining contact between the conductor and a wall structure disposed adjacent the conductor in the presence of relative movement between the conductor and the wall structure, the conductor conducting current into and out of the electrochemical cell and conducting thermal energy between the electrochemical cell and a thermally conductive and electrically resistive material disposed between the conductor and the wall structure.

2. The device of claim 1, wherein the conductor comprises a flexible lead that attaches to an external connection for conducting current into and out of the electrochemical cell.

3. The device of claim 1, wherein the conductor comprises a lead that attaches to an external connection and cooperates with the anode and cathode contacts to conduct current into and out of the electrochemical cell.

4. The device of claim 1, wherein the resilient portion of the conductor has one of a substantially C-shaped, double C-shaped, Z-shaped, O-shaped, S-shaped, V-shaped, L-shaped, single finger-shaped, or multiple finger-shaped cross-section.

5. The device of claim 1, wherein:
   the electrochemical cell comprises laterally offset anode and cathode current collecting films coupled to the anode and cathode contacts, respectively; and
   the resilient portion of the conductor comprises the laterally offset anode and cathode current collecting films.

6. The device of claim 1, further including a spring element that cooperates with the resilient portion of the conductor to maintain contact between the conductor and the wall structure.

7. The device of claim 6, wherein the spring element includes a stop that impedes collapsing of the resilient portion of the conductor when the resilient portion is subjected to a compressive force.

8. The device of claim 6, wherein the spring element includes a protrusion that provides electrical insulation between the conductor and a conductor of an adjacently disposed electrochemical cell in the presence of relative movement between the conductor and the wall structure.

9. The device of claim 6, wherein the spring element includes a first protrusion and a second protrusion, the first and second protrusions respectively providing electrical insulation between a conductor and one of the anode or cathode contacts of an adjacently disposed electrochemical cell in the presence of relative movement between the conductor and the wall structure.

10. The device of claim 1, further including a substantially cylindrical spring element captured by the resilient portion of the conductor that cooperates with the resilient portion to maintain contact between the conductor and the wall structure.

11. The device of claim 1, wherein the conductor is spot welded to the one of the anode or cathode contacts.

12. The device of claim 1, wherein the one of the anode contact or the cathode contacts comprises a copper contact layer, and the conductor is welded to the copper contact layer.

13. The device of claim 1, wherein the conductor has a length approximately coextensive with a length of the anode contact or the cathode contact.

14. The device of claim 1, wherein the thermally conductive and electrically resistive material comprises one of an anodized coating on the wall structure, a sheet of thermally conductive polymer material adjacent the wall structure, a thermal compound on the wall structure or a mineral-based sheet material adjacent the wall structure.

15. The device of claim 1, wherein the resilient portion of the conductor varies in position within a range of approximately 1 to 3 millimeters to maintain contact between the conductor and the wall structure in the presence of relative movement between the conductor and the wall structure.

16. An energy storage device, comprising:
    an enclosure including a first wall structure and a second wall structure;
    a thermally conductive and electrically resistive material disposed on or adjacent to the first wall structure;
    a thin-film electrochemical cell disposed between the first and second wall structures; and
    a conductor, defining one of a positive contact or a negative contact for the electrochemical cell, that maintains engagement with the material disposed on the first wall structure in response to relative movement between the electrochemical cell and the first wall structure, the conductor defining a current path for conducting current between the electrochemical cell and a contact external to the electrochemical cell, and defining a thermal flux path for conducting thermal energy between the electrochemical cell and the thermally conductive and electrically resistive material disposed on the first wall structure.

17. The device of claim 16, wherein the conductor has one of a substantially C-shaped, double C-shaped, Z-shaped, O-shaped, S-shaped, V-shaped, L-shaped, single finger-shaped, or multiple finger-shaped cross-section.

18. The device of claim 16, further including a spring element captured by the conductor that cooperates with the conductor to maintain engagement between the conductor and the material disposed on the first wall structure in response to relative movement between the electrochemical cell and the first wall structure.

19. The device of claim 18, wherein the spring element includes a stop that impedes collapsing of the conductor when the conductor is subjected to a compressive force.

20. The device of claim 18, wherein the spring element includes a protrusion that provides electrical insulation between the conductor and a conductor of an adjacently disposed electrochemical cell in response to relative movement between the conductor and the first wall structure.

21. The device of claim 16, wherein the conductor has a length approximately coextensive with a length of the electrochemical cell.

22. The device of claim 16, wherein the thermally conductive and electrically resistive material comprises one of an anodized coating on the first wall structure, a polymer material adjacent the first wall structure, a thermal compound on the first wall structure or a sheet material disposed adjacent the first wall structure.

23. The device of claim 16, wherein the conductor varies in position within a range of approximately 1 to 3 millimeters to maintain engagement with the material disposed on the first wall structure in response to relative movement between the electrochemical cell and the first wall structure.

24. A method of transferring thermal energy and electrical current into and out of a thin-film electrochemical cell, comprising:

conducting current between the electrochemical cell and a contact external to the electrochemical cell using a resilient conductor defining one of a positive or a negative contact for the electrochemical cell;

conducting, using the resilient conductor, thermal energy between the electrochemical cell and thermally conductive and electrically resistive material disposed adjacent the resilient conductor; and maintaining mechanical contact between the resilient conductor and the thermally conductive and electrically resistive material in response to variations in a separation distance between the electrochemical cell and the thermally conductive and electrically resistive material.

25. The method of claim 24, wherein maintaining mechanical contact between the resilient conductor and the thermally conductive and electrically resistive material comprises mechanically deforming the resilient conductor in response to variations in the separation distance between the electrochemical cell and the thermally conductive and electrically resistive material.

26. The method of claim 24, wherein maintaining mechanical contact between the resilient conductor and the thermally conductive and electrically resistive material comprises displacing a portion of the resilient conductor within a range of 1 to 3 millimeters in response to variations in the separation distance between the electrochemical cell and the thermally conductive and electrically resistive material.

27. The method of claim 24, wherein:

the electrochemical cell comprises laterally offset anode and cathode current collecting films; and maintaining mechanical contact between the resilient conductor and the thermally conductive and electrically resistive material comprises flexing the laterally offset anode and cathode current collecting films in response to variations in the separation distance between the electrochemical cell and the thermally conductive and electrically resistive material.

28. The device of claim 1, wherein the thermally conductive and electrically resistive material comprises an anodized surface of the wall structure, the anodized surface comprising a conformal plastic coating.

29. The device of claim 1, wherein the wall structure is fabricated from stainless steel, and the thermally conductive and electrically resistive material comprises one of a sheet of plastic material or a mineral-based sheet material.

30. The device of claim 1, wherein:

the device comprises a plurality of the thin-film electrochemical cells; and the conductor comprises a sheet of electrically conductive material that extends across the anode contact or the cathode contact of at least two of the electrochemical cells.

31. The device of claim 30, wherein the thermally conductive and electrically resistive material comprises one of an anodized coating on the wall structure, a sheet of thermally conductive polymer material adjacent the wall structure, a thermal compound on the wall structure or a mineral-based sheet material adjacent the wall structure.

32. The device of claim 1, wherein the conductor comprises a plurality of stacked conductors.

* * * * *

UNITED STATES PATENT AND TRADEMARK OFFICE
CERTIFICATE OF CORRECTION

PATENT NO.     : 6,117,584

DATED          : September 12, 2000

INVENTOR(S)    : Joseph A. Hoffman, et al.

It is certified that error appears in the above-identified patent and that said Letters Patent are hereby corrected as shown below:

In section [73], after 3M Innovative Properties Company, St. Paul, MN, please insert --Hydro-Quebec, Montreal, Quebec--

Signed and Sealed this

First Day of May, 2001

*Attest:*

NICHOLAS P. GODICI

*Attesting Officer*     Acting Director of the United States Patent and Trademark Office